(12) United States Patent
Chen et al.

(10) Patent No.: US 10,727,491 B2
(45) Date of Patent: Jul. 28, 2020

(54) BATTERY

(71) Applicants: Positec Power Tools (Suzhou) Co., Ltd., Suzhou, Jiangsu Province (CN); Pu Chen, Waterloo (CA)

(72) Inventors: Pu Chen, Waterloo (CA); Jing Wang, Waterloo (CA); Yang Liu, Waterloo (CA)

(73) Assignees: Positec Power Tools (Suzhou) Co. Ltd., Suzhou, Jiangsu (CN); Pu Chen, Waterloo, Ontario (CA)

( * ) Notice: Subject to any disclaimer, the term of this patent is extended or adjusted under 35 U.S.C. 154(b) by 298 days.

(21) Appl. No.: 15/592,014

(22) Filed: May 10, 2017

(65) Prior Publication Data
US 2017/0244102 A1 Aug. 24, 2017

Related U.S. Application Data

(63) Continuation of application No. 14/123,430, filed as application No. PCT/CN2012/076413 on Jun. 3, 2012, now Pat. No. 9,680,154.

(51) Int. Cl.
*H01M 4/36* (2006.01)
*H01M 4/66* (2006.01)
(Continued)

(52) U.S. Cl.
CPC ......... *H01M 4/661* (2013.01); *H01M 4/0404* (2013.01); *H01M 4/0426* (2013.01);
(Continued)

(58) Field of Classification Search
CPC ............. H01M 10/0525; H01M 10/36; H01M 2004/027; H01M 2220/20;
(Continued)

(56) References Cited

U.S. PATENT DOCUMENTS 6,183,718 B1 * 2/2001 Barker .............. C01G 45/1221
423/599
6,623,892 B1 * 9/2003 Yamaguchi ....... H01M 10/0525
252/62.2
(Continued)

FOREIGN PATENT DOCUMENTS

CN 1097526 A 1/1995
CN 101154745 A 4/2008
(Continued)

OTHER PUBLICATIONS

CIPO, Office Action dated Jul. 9, 2014 in copending China Application No. 201210180299.
(Continued)

*Primary Examiner* — Carlos Barcena
(74) *Attorney, Agent, or Firm* — Fulwilder Patton LLP

(57) ABSTRACT

A battery, including a cathode, an anode, an electrolyte; the cathode including a cathode active material capable of reversibly intercalating-deintercalating ions; the anode including an anode current collector that does not participate in the electrochemical reaction; the electrolyte including a solvent capable of dissolving solute, the solute being ionized to at least an active ions that can be reduced to a metallic state during a charge cycle and be oxidized from the metallic state to the dissolved ion state during a discharge cycle and/or an intercalation-deintercalation ions that can deintercalate from the cathode active material during the charge cycle and intercalate into the cathode active material during the discharge cycle; the anode further comprising an anode active material formed on the anode current collector capable of being oxidized and dissolved to active ion state during the discharge cycle.

14 Claims, 17 Drawing Sheets

(51) Int. Cl.
*H01M 4/38* (2006.01)
*H01M 4/62* (2006.01)
*H01M 10/0525* (2010.01)
*H01M 4/485* (2010.01)
*H01M 4/505* (2010.01)
*H01M 4/525* (2010.01)
*H01M 4/587* (2010.01)
*H01M 10/36* (2010.01)
*H01M 4/134* (2010.01)
*H01M 4/1395* (2010.01)
*H01M 4/04* (2006.01)
*H01M 4/80* (2006.01)
*H01M 4/02* (2006.01)

(52) U.S. Cl.
CPC ......... *H01M 4/134* (2013.01); *H01M 4/1395* (2013.01); *H01M 4/366* (2013.01); *H01M 4/38* (2013.01); *H01M 4/485* (2013.01); *H01M 4/505* (2013.01); *H01M 4/525* (2013.01); *H01M 4/587* (2013.01); *H01M 4/625* (2013.01); *H01M 4/662* (2013.01); *H01M 4/663* (2013.01); *H01M 4/666* (2013.01); *H01M 4/667* (2013.01); *H01M 4/669* (2013.01); *H01M 10/0525* (2013.01); *H01M 10/36* (2013.01); *H01M 4/045* (2013.01); *H01M 4/622* (2013.01); *H01M 4/80* (2013.01); *H01M 2004/027* (2013.01); *H01M 2220/20* (2013.01); *H01M 2220/30* (2013.01); *H01M 2300/0002* (2013.01); *H01M 2300/0005* (2013.01); *Y02E 60/122* (2013.01); *Y02P 70/54* (2015.11)

(58) Field of Classification Search
CPC ..... H01M 2220/30; H01M 2300/0002; H01M 2300/0005; H01M 4/0404; H01M 4/0426; H01M 4/045; H01M 4/134; H01M 4/1395; H01M 4/366; H01M 4/38; H01M 4/485; H01M 4/505; H01M 4/525; H01M 4/587; H01M 4/622; H01M 4/625; H01M 4/661; H01M 4/662; H01M 4/663; H01M 4/666; H01M 4/667; H01M 4/669; H01M 4/80

See application file for complete search history.

(56) References Cited

U.S. PATENT DOCUMENTS

| | | | |
|---|---|---|---|
| 2004/0002005 A1* | 1/2004 | Gao | H01M 4/13 429/231.95 |
| 2005/0175900 A1* | 8/2005 | Yasuda | H01M 4/0404 429/231.95 |
| 2009/0034515 A1 | 2/2009 | Cook et al. | |
| 2009/0253025 A1 | 10/2009 | Whitacre | |
| 2009/0325071 A1* | 12/2009 | Verbrugge | C30B 25/00 429/219 |
| 2010/0099031 A1 | 4/2010 | Kato et al. | |
| 2012/0034515 A1* | 2/2012 | Kang | H01M 4/42 429/188 |
| 2014/0315083 A1 | 10/2014 | Liu et al. | |

FOREIGN PATENT DOCUMENTS

| | | |
|---|---|---|
| CN | 101783416 A | 7/2010 |
| CN | 102005615 A | 4/2011 |
| CN | 102055029 A | 5/2011 |
| CN | 102110839 A | 6/2011 |
| CN | 102208598 A | 10/2011 |
| WO | 02061863 A1 | 8/2002 |
| WO | 2010118586 A1 | 10/2010 |
| WO | 2011079482 A1 | 7/2011 |

OTHER PUBLICATIONS

Johnson et al., Structural and electrochemical studies of a-manganese dixoide (a-Mn02), Journal of Power Sources, Oct. 1, 1997, vol. 68, No. 2, pp. 570-577, Elsevier SA, Switzerland.

Zhu, Ke, International Search Report for corresponding PCT Application No. PCT/CN2012/076413.

* cited by examiner

BATTERY

CROSS-REFERENCES TO RELATED APPLICATIONS

This application is a continuation of U.S. patent application Ser. No. 14/123,430, which claims priority from PCT Application No. PCT/CN2012/076413, filed Jun. 3, 2012, both of which are incorporated by reference in their entirety.

FIELD OF THE INVENTION

The present invention relates to an electrochemical energy storage technology. In particular, the invention relates to a battery.

BACKGROUND

The wide use of new energy leads to a rapid expansion of secondary battery market. The demand of secondary battery is sharply increased. A cheap, reliable, safe and long-life secondary battery is in urgent requirement no matter in electric vehicles, wind power, solar energy grid or regulation peak load. The current development of secondary battery mainly focuses on lithium-ion batteries, high temperature sodium-sulfur batteries, sodium nickel batteries and vanadium redox flow battery. These batteries have their advantages, such as lithium-ion batteries and sodium-sulfur battery with long life and high energy density, vanadium redox flow battery with theoretically unlimited life. However, no kind of batteries are able to satisfy cost, reliable, safe and long life requirements simultaneously. Conventional lithium-ion batteries are expensive and of safety risk; sodium-sulfur battery is expensive and of high manufacturing threshold; several technology bottlenecks of vanadium redox flow battery are currently unable to solve.

To solve this problem, many researchers turn to aqueous Li-ion battery, hoping to drastically reduce the cost and improve the safety of Li-ion batteries by using water-based electrolytes in place of organic electrolytes. In 1994, Jeff Dahn et al. presented an aqueous battery with $LiMn_2O_4$ as the cathode material, vanadium oxide such as $LiV_3O_8$ as the anode material, and a water solution of lithium salts as the electrolyte, but the toxicity of vanadium and poor stability of anode in water limit the development of this kind of battery. Up to now, all reported aqueous Li-ion batteries used the same principle as the Li-ion battery, based on an embedded type structure on both positive and negative electrodes, such as $LiMn_2O_4/VO_2$, $LiNi_{0.81}Co_{0.19}O_2/LiV_3O_8$, $LiMn_2O_4/TiP_2O_7$, $LiMn_2O_4/LiTi_2(PO_4)_3$, and $LiCoO_2/LiV_3O_8$.

SUMMARY OF THE INVENTION

The present invention aims to provide a low-cost, safe, reliable and excellent performance battery.

Accordingly to one aspect, the invention provides a battery comprising a cathode, an anode and an electrolyte; the cathode comprises a cathode active material which is capable of reversibly intercalating-deintercalating ions; the anode at least comprises an anode current collector that does not participate in the electrochemical reaction; the electrolyte comprises at least a solvent capable of dissolving solute, the solute being ionized to at least an active ions that can be reduced to a metallic state during a charge cycle and be oxidized from the metallic state to the dissolved ion state during a discharge cycle and/or at least an intercalation-deintercalation ions that can deintercalate from the cathode active material during the charge cycle and intercalate into the cathode active material during the discharge cycle; the anode further comprises an anode active material formed on the anode current collector; the anode active material being oxidized from a metallic state to the dissolved active ion state during the discharge cycle.

Preferably, the anode active material is formed on the anode current collector by the means of coating, electroplating or sputtering.

Preferably, the anode active material comprises at least one metal selected from Zn, Fe, Cr, Cu, Mn, Ni and combinations thereof.

Preferably, the anode current collector comprises one metal selected from Ni, Cu, Ag, Pb, Fe, Al or passivated metal thereof.

Preferably, the anode current collector comprises at least one selected from carbon based material, stainless steel, silicon or a metal with electroplating layer or coating layer selected at least one of C, Sn, In, Ag, Pb, Co, or an alloy thereof, or oxide thereof.

Preferably, the thickness range of the electroplating layer or coating layer is 1-1000 nm.

Preferably, the anode further comprises a porous layer formed on the anode current collector, the porous layer has micron or sub-micron or nano pores.

Preferably, the porous layer comprises at least one carbon-based material selected from Ketjen black, active carbon, carbon nanotube, carbon fiber, or graphite.

Preferably, the porous layer comprises a carbon-based material, the carbon-based material is a mixture of active carbon powder and binder, the weight rate range of the active carbon powder in the porous layer is 20-99%.

Preferably, the anode comprises a graphene layer formed on the anode current collector.

Preferably, the anode current collector is copper; the anode active material is zinc.

Preferably, the anode active material is formed on the anode current collector being suffered a surface pre-treatment, the surface pre-treatment is selected from at least one of mechanical treatment, chemical treatment, or electrochemical treatment.

Preferably, pH range of the electrolyte is 3-7.

Preferably, the active ion is in the form of at least one of chloride, sulphate, nitrate, acetate, formate, phosphate in the electrolyte.

Preferably, the cathode active material is capable of reversibly intercalating-deintercalating Li ion, Na ion, Mg ion or Zn ion.

Preferably, material of the cathode current collector is selected from graphite, stainless steel, Al alloy, or passivated stainless steel, or passivated Al alloy.

Accordingly to one aspect, the invention provides a battery comprising a cathode, an anode and an electrolyte. The cathode comprises a cathode active material which is capable of reversibly intercalating-deintercalating ions; The anode comprises an anode active material that participates in the electrochemical reaction; The electrolyte comprises at least one solvent capable of dissolving solute, the solute being ionized to at least an intercalation-deintecalation ions which is capable of deintercalating from the cathode active material during the charge cycle and intercalating into the cathode active material during the discharge cycle. The cathode active material contains no intercalation-deintecalation ions. The first operation mode of the battery is a discharging process that intercalation-deintecalation ions in the electrolyte intercalate into the cathode active material and the anode active material is oxidized and dissolved to the active ions.

Accordingly to one aspect, the invention provides a battery comprising a cathode, an anode and an electrolyte. The cathode comprises a cathode active material which is capable of reversibly intercalating-deintercalating ions; The anode comprises an anode active material that participates in the electrochemical reaction; The electrolyte comprises at least one solvent capable of dissolving solute, the solute being ionized to at least an active ions that can be reduced to a metallic state during a charge cycle and be oxidized from the metallic state to the dissolved ion state during a discharge cycle and at least an intercalation-deintercalation ions which can deintercalate from the cathode active material during the charge cycle and intercalate into the cathode active material during the discharge cycle. The first operation mode of the battery is a discharging process that intercalation-deintecalation ions in electrolyte intercalate into the cathode active material and the anode active material is oxidized and dissolved to the active ions or a charging process that intercalation-deintecalation ions deintercalate from the cathode active material and the active ions in the electrolyte are reduced from ion state to metal and deposited on the anode.

Preferably, the first operation mode of the battery is a charging process.

According to one aspect, the present invention provides a battery comprising a cathode, an anode and an electrolyte. The cathode comprises a cathode active material which is capable of reversibly intercalating-deintercalating ions; The anode comprises an anode active material that participates in the electrochemical reaction; The electrolyte comprises at least one solvent capable of dissolving solute, the solute being ionized to at least an intercalation-deintercalation ions which can deintercalate from the cathode active material during the charge cycle and intercalate into the cathode active material during the discharge cycle. The first operation mode of the battery is a discharging process that intercalation-deintecalation ions in electrolyte intercalate into the cathode active material and the anode active material is oxidized and dissolved to the active ions.

According to one aspect, the present invention provides a battery comprising a cathode, an anode and an electrolyte. The cathode comprises a cathode active material which is capable of reversibly intercalating-deintercalating ions; The anode comprises an anode active material that participates in the electrochemical reaction; The electrolyte comprises at least one solvent capable of dissolving solute, solute being ionized to at least an active ions that can be reduced to a metallic state during the charge cycle and oxidized from the metallic state to the dissolved ion state during the discharge cycle. The first operation mode of the battery is a charging process that intercalation-deintecalation ions deintercalate from the cathode active material and the active ions in electrolyte are reduced from ion state to metal and deposited on the anode.

According to one aspect of the present invention, a battery comprises a cathode, an anode, and an electrolyte. The cathode comprises a cathode active material which is capable of reversibly intercalating-deintercalating ions; The anode comprises an anode active material that participates in the electrochemical reaction; The electrolyte comprises at least one solvent capable of dissolving solute, solute being ionized to at least an active ions that can be reduced to a metallic state during the charge cycle and oxidized from the metallic state to the dissolved ion state during the discharge cycle. The cathode active material comprises the intercalation-deintercalation ions and has no unoccupied interstitial sites in the crystal structure therein. The first operation mode of the battery is a charging process that the intercalation-deintecalation ions deintercalate from the cathode active material and active ions in electrolyte are reduced from ion state to metal and deposited on the anode.

According to one aspect of the present invention, a battery comprises a cathode, an anode, and an electrolyte. The cathode comprises a cathode active material which is capable of reversibly intercalating-deintercalating ions; The anode comprises an anode active material that participates in the electrochemical reaction; The electrolyte comprises at least one solvent capable of dissolving solute, the solute being ionized to at least an active ions that can be reduced to a metallic state during the charge cycle and oxidized from the metallic state to the dissolved ion state during the discharge cycle; The cathode active material comprises over-intercalated intercalation-deintercalation ions and is modified or coated with metal or metal oxide; The first operation mode of the battery is a charging process that the intercalation-deintecalation ions deintercalate from the cathode active material and the active ions in the electrolyte is reduced from ion state to metal and deposited on the anode.

Preferably, the metal is Al; the metal oxide is Al oxide.

The battery provided in the present invention is safe, low-cost, excellent performance and long life cycle, while various first operation modes can be chosen according to different requirements. The battery is suitable to be used as an energy storage system in the field of large-scale energy storage and as a substitute for lead-acid battery.

According to one aspect of the present invention, a battery comprises a cathode, an anode and an electrolyte. the cathode comprises a cathode current collector and a cathode active material which is capable of reversibly intercalating-deintercalating ions; The anode at least comprises an anode current collector; The electrolyte comprises at least one solvent capable of dissolving solute, the solute being ionized to at least an active ions that can be reduced to a metallic state during the charge cycle and oxidized from the metallic state to the dissolved ion state during the discharge cycle. Material of the cathode current collector is selected from one of carbon based material, metal or alloy.

Preferably, the carbon based material is selected from one of grass carbon, graphite, carbon foam, carbon felt, carbon fiber.

Preferably, the metal is selected from one of Al, Fe, Cu, Pb, Ti, Cr, Mo, Co, Ag or passivated metal thereof.

Preferably, the alloy is selected from one of stainless steel, Al alloy, Ni alloy, Ti alloy, Cu alloy, Co alloy, Ti—Pt alloy, Pt—Rh alloy, or passivated alloy thereof.

Preferably, the anode current collector is selected from one of Ni, Cu, Ag, Pb, Sn, Fe, Al or passivated metal thereof.

Preferably, the anode current collector is selected from at least one of carbon based material, stainless steel, silicon or metal with electroplating layer or coating layer selected form at least one of C, Sn, In, Ag, Pb, Co, Zn, and alloy thereof, or oxide thereof.

Preferably, the thickness range of the electroplating layer or coating layer is 1-1000 nm.

Preferably, the active ion comprises metal ion, the metal is selected from at least one of Zn, Fe, Cr, Cu, Mn, Ni.

Preferably, the metal ion is in the form of at least one of chloride, sulphate, nitrate, acetate, formate, phosphate in the electrolyte.

Preferably, the cathode active material is capable of reversibly intercalating-deintercalating Li ion, Na ion, Mg ion or Zn ion.

Preferably, the cathode current collector is selected from one of graphite, stainless steel, Al alloy, or passivated stainless steel, or passivated Al alloy.

According to one aspect of the present invention, a battery comprises a cathode, an anode and an electrolyte. the cathode comprises a cathode current collector and a cathode active material which is capable of reversibly intercalating-deintercalating ions; The anode at least comprises an anode current collector; The electrolyte comprises at least one solvent capable of dissolving solute, the solute being ionized to at least an active ions that can be reduced to a metallic state during the charge cycle and oxidized from the metallic state to the dissolved ion state during the discharge cycle. Material of the cathode current collector is selected from stainless steel, Al alloy, or passivated stainless steel, or passivated Al alloy.

Preferably, the mode of the Al alloy is 6000 series.

Preferably, the mode of the stainless steel is 300 series.

Preferably, the anode further comprises an anode active material; the anode active material can be oxidized and dissolved to the active ion state during the discharge cycle.

According to one aspect of the present invention, a battery comprising a cathode, an anode and an electrolyte, the cathode comprises a cathode current collector and a cathode active material which is capable of reversibly intercalating-deintercalating ion; The anode at least comprises an anode active material that participates in the electrochemical reaction; The electrolyte comprises at least one solvent capable of dissolving solute, the solute being ionized to at least an active ions that can be reduced to a metallic state during the charge cycle and oxidized from the metallic state to the dissolved ion state during the discharge cycle and/or at least an intercalation-deintercalation ions that can deintercalate from the cathode active material during the charge cycle and intercalate into the cathode active material during the discharge cycle; the anode further comprises an anode active material, the anode active material can be oxidized and dissolved to the active ion state during the discharge cycle. The cathode current collector is selected from one of carbon based material, metal or alloy.

According to one aspect of the present invention, a battery comprises a cathode, an anode and an electrolyte, the cathode comprises a cathode current collector and a cathode active material which is capable of reversibly intercalating-deintercalating ions; The anode comprises an anode current collector that does not participate in the electrochemical reaction; The electrolyte comprises at least one solvent capable of dissolving solute, the solute being ionized to at least an active ions that can be reduced to a metallic state during the charge cycle and oxidized from the metallic state to the dissolved ion state during the discharge cycle. The cathode current collector is selected from one of carbon based material, metal or alloy.

According to one aspect of the present invention, a method of passivating current collector is also provided. Current collector being passivated is of good stability within the operation voltage window, which ensures the stability of battery.

According to one aspect of the present invention, a method of passivating current collector includes chemical or electrochemical passivation.

Preferably, the chemical passivation includes oxidizing current collector through oxidizing agent to form a passivation film; the oxidizing agent comprises concentrated nitric acid and ceric sulphate.

Preferably, the electrochemical passivation includes charging and discharging the current collector or battery with the current collector to form a passivation film.

According to one aspect of the present invention, a method to passivate current collector is provided, the current collector comprises Al, Al alloy or stainless steel; the method comprises charging and discharging a battery with the current collector, the cut-off potential of charging and discharging is 2.35-2.45V and 1.35-1.45V respectively, the charging and discharging cycle is not less than once.

According to one aspect of the present invention, a method to passivate current collector is provided, the current collector comprises Al, Al alloy or stainless steel; the method comprises the following steps: charging and discharging a three-electrode system or two-electrode system containing the current collector as working electrode, the cut-off potential of charging and discharging is 2.35-2.45V and 1.35-1.45V respectively.

According to one aspect of the present invention, a method to passivate current collector is provided, the current collector comprises Al, Al alloy or stainless steel; the method comprises the following steps: putting the current collector in solution containing oxidizing agent and maintaining for 0.5-1 hour to form a passivation film, taking out the current collector, washing and drying.

The battery provided in the present invention is safe, low-cost, of excellent performance and long life cycle, while the passivated current collector can be stable within the operation potential window of battery and does not participate in electrochemical reaction. The battery is suitable for large-scale energy storage field and an alternative instead of lead-acid battery.

According to one aspect of the present invention, a battery comprises a cathode, an anode and an electrolyte, the cathode comprises cathode current collector and cathode active material which can reversibly intercalate-deintercalate ion; The anode at least comprises anode current collector; The electrolyte comprises at least one solvent capable of dissolving solute, the solute can ionize at least one active ion that can be reduced to a metallic state during the charge cycle and oxidized from the metallic state to the dissolved ion state during the discharge cycle. The anode further comprises porous layer or graphene layer formed on the surface of the anode current collector, the porous layer has micron or sub-micron or nano pores.

Preferably, the thickness range of the porous layer or graphene layer is 0.05-1 mm.

Preferably, the volume rate range of the micron or sub-micron pores in porous layer is 50-95%.

Preferably, the volume rate range of the nano pores in porous layer is 10-99%.

Preferably, the average diameter range of the nano pores is 1-150 nm.

Preferably, material of the porous layer comprises carbon based material.

Preferably, the carbon based material is selected from at least one of Ketjen black, active carbon, carbon nanotube, carbon fiber, or graphite.

Preferably, the carbon based material is a mixture of active carbon powder and binder, the weight rate range of the active carbon powder in the porous layer is 20-99%

Preferably, the anode further comprises an anode active material formed on the anode current collector, the anode active material can be oxidized and dissolved to the active ion state during the discharge cycle.

Preferably, the anode current collector is selected from one metal of Ni, Cu, Ag, Pb, Sn, Fe, Al or passivated metal thereof.

Preferably, the anode current collector is selected from at least one of carbon based material, stainless steel, silicon or a metal with electroplating layer or coating layer selected at least one of C, Sn, In, Ag, Pb, Co, or alloy thereof, or oxide thereof.

Preferably, the thickness range of the electroplating layer or coating layer is 1-1000 nm.

Preferably, the active ion comprises metal ion, the metal is selected from at least one of Zn, Fe, Cr, Cu, Mn, Ni.

Preferably, the metal ion is in the form of at least one of chloride, sulphate, nitrate, acetate, formate, phosphate in the electrolyte.

Preferably, the cathode active material is capable of reversibly intercalating-deintercalating Li ion, Na ion, Mg ion or Zn ion.

Preferably, the cathode current collector is selected from one of graphite, stainless steel, Al alloy, or passivated stainless steel, or passivated Al alloy.

According to one aspect of the present invention, a battery comprises a cathode, an anode and an electrolyte, the cathode comprises a cathode active material which is capable of reversibly intercalating-deintercalating ions; The anode comprises an anode active material that participate in the electrochemical reaction; The electrolyte comprises at least one solvent capable of dissolving solute, the solute being ionized at least an active ions that can be reduced to a metallic state during the charge cycle and oxidized from the metallic state to the dissolved ion state during the discharge cycle and/or at least an intercalation-deintercalation ions that can deintercalate from the cathode active material during the charge cycle and intercalate into the cathode active material during the discharge cycle; the anode active material can be oxidized and dissolved to the active ion state during the discharge cycle. The anode further comprises a porous layer or a graphene layer formed on the surface of the anode current collector, the porous layer has micron or sub-micron or nano pores.

According to one aspect of the present invention, a battery comprises a cathode, an anode and an electrolyte, the cathode comprises a cathode current collector and a cathode active material which is capable of reversibly intercalating-deintercalating ions; The anode is an electrochemical inert and conductive electrode that does not participate in electrochemical reaction; The electrolyte comprises a water solution containing metal ions that can be reduced to a metallic state during the charge cycle and oxidized from the metallic state to the dissolved ion state during the discharge cycle. The anode further comprises a porous layer formed on the surface of the anode current collector; the porous layer has micron pores.

The battery provided in the present invention is safe and low-cost. The porous layer or graphene layer formed on the anode not only provides a large specific surface area for the deposition of active ions and restrains the dendrite of anode, but also reduces the diffusion path and resistance of active ions, which ensures the battery of excellent performance and life. The battery is suitable to be used as an energy storage system in the field of large-scale energy storage and as a substitute for lead-acid battery.

According to one aspect of the present invention, a battery comprises a cathode, an anode and an electrolyte, the cathode comprises a cathode current collector and a cathode active material that participates in the electrochemical reaction, the cathode active material is capable of reversibly intercalating-deintercalating ions; The anode at least comprises an anode current collector; The electrolyte comprises at least one solvent capable of dissolving solute, the solute being ionized to at least an active ions that can be reduced to a metallic state during the charge cycle and oxidized from the metallic state to the dissolved ion state during the discharge cycle; the pH range of the electrolyte is 3-7.

Preferably, the solvent is a water or alcohol-based solution.

Preferably, the active ion comprises metal ion, the metal is selected from at least one of Zn, Fe, Cr, Cu, Mn, Ni or Sn.

Preferably, the metal ion is in the form of at least one of chloride, sulphate, nitrate, acetate, formate, phosphate in the electrolyte.

Preferably, the pH of the electrolyte is 4.

Preferably, the anode current collector is selected from one metal of Ni, Cu, Ag, Pb, Sn, Fe, Al or passivated metal thereof.

Preferably, the anode current collector is selected from at least one of carbon based material, stainless steel, silicon or a metal with electroplating layer or coating layer selected at least one of C, Sn, In, Ag, Pb, Co, or alloy thereof, or oxide thereof.

Preferably, the thickness range of the electroplating layer or coating layer is 1-1000 nm.

Preferably, the cathode active material is capable of reversibly intercalating-deintercalating Li ion, Na ion, Mg ion or Zn ion.

Preferably, the cathode current collector is selected from one of graphite, stainless steel, Al alloy, or passivated stainless steel, or passivated Al alloy.

According to one aspect of the present invention, a battery comprises a cathode, an anode and an electrolyte, the cathode comprises a cathode current collector and a cathode active material that participates in the electrochemical reaction, the cathode active material is capable of reversibly intercalating-deintercalating ions; The anode is an electrochemical inert and conductive electrode; The electrolyte comprises a water solution containing metal ions that can be reduced to a metallic state during the charge cycle and oxidized from the metallic state to the dissolved ion state during the discharge cycle; the pH range of electrolyte is 3-7.

According to one aspect of the present invention, a battery comprises a cathode, an anode and an electrolyte, the cathode comprises a cathode active material which is capable of reversibly intercalating-deintercalating ions; The anode comprises an anode active material that participates in the electrochemical reaction; The electrolyte comprises at least one solvent capable of dissolving solute, the solute being ionized to at least an active ions that can be reduced to a metallic state during the charge cycle and oxidized from the metallic state to the dissolved ion state during the discharge cycle and/or at least an intercalation-deintarcalation ions which is capable of deintercalating from the cathode active material during the charge cycle and intercalating into the cathode active material during the discharge cycle; the anode active material can be oxidized and dissolved to the active ion state during the discharge cycle; the pH range of electrolyte is 3-7.

The battery provided in the present invention is safe and low-cost. The concentration of active ion and intercalation-deintercalation ion is proper in electrolyte within the pH range 3-7, which ensures the capacity of battery. The battery is suitable to be used as an energy storage system in the field of large-scale energy storage and as a substitute for lead-acid battery.

Figure 1:
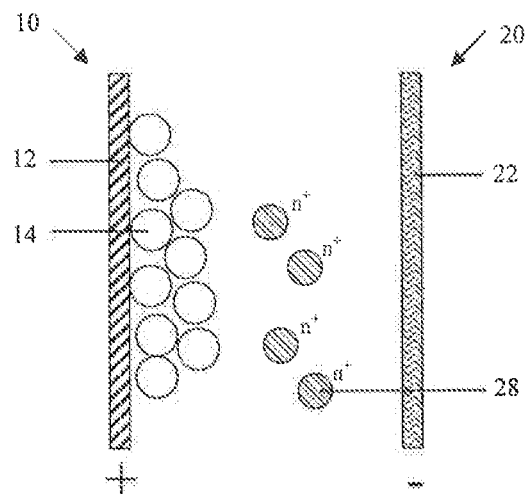
FIG. 1 schematically shows battery structure in the first embodiment.

Wherein:

| 10. cathode | 20. anode | 28. active ion |
| 12. cathode current collector | 22. cathode current collector | 30. porous layer |
| 14. cathode active material | 16. intercalation-deintercalation ion | |
| 24. anode active material | 26. active ion deposition layer | |

DETAILED DESCRIPTION OF THE PREFERRED EMBODIMENTS

In one aspect, the present invention provides a battery with high energy density, stable cycle performance that is suitable for electric vehicle, power tools, portable electronic products such as mobile phone, laptop.

Embodiment 1

The battery comprises a cathode 10, an anode 20 and an electrolyte (not shown in Figures). The cathode 10 comprises a cathode current collector 12 and a cathode active material 14 which participates in the electrochemical reaction; the anode 20 at least comprises an anode current collector 22; the electrolyte comprises at least one solvent capable of dissolving solute, solute being ionized to at least an active ions 28 that can be reduced to a metallic state during the charge cycle and oxidized from the metallic state to the dissolved ion state during the discharge cycle.

As shown in FIG. 1, FIG. 1 schematically shows the battery structure in the first embodiment in which anode 20 only comprises an anode current collector 22.

The cathode active material 14 participates in the cathode reaction which is capable of reversibly intercalating-deintercalating ions or functional group. Specifically, the cathode active material 14 is capable of reversibly intercalating-deintercalating Li ion, Na ion, Zn ion or Mg ion.

According to one aspect of the present invention, the cathode active material 14 which is capable of intercalating-deintercalating Li ion comprises a spinel structure compound having the general formula $Li_{1+x}Mn_yM_zO_k$, wherein $-1 \leq x \leq 0.5$, $1 \leq y \leq 2.5$, $0 \leq z \leq 0.5$, and $3 \leq k \leq 6$. M is selected from at least one of the following: Na, Li, Co, Mg, Ti, Cr, V, Zn, Zr, Si, and Al. In one embodiment, the cathode active material 14 is $LiMn_2O_4$, preferably, the cathode active material 14 is $LiMn_2O_4$ that has been doped, coated, or modified.

According to one aspect of the present invention, the cathode active material 14 which is capable of intercalating-deintercalating Li ion comprises a layered structure compounds having the general formula $Li_{1+x}M_yM'_zM''_cO_{2+n}$, wherein $-1 < x \leq 0.5$, $0 \leq y \leq 1$, $0 \leq z \leq 1$, $0 \leq c \leq 1$, and $-0.2 \leq n \leq 0.2$. M, M' and M" are selected from at least one of the following: Ni, Mn, Co, Mg, Ti, Cr, V, Zn, Zr, Si, and Al. According to one embodiment, the cathode active material 14 comprises $LiCoO_2$.

According to one aspect of the present invention, the cathode active material 14 which is capable of intercalating-deintercalating Li ion comprises an olivine structure compound having the general formula $Li_xM_{1-y}M'_y(X'O_4)_n$, wherein $0<x\leq2$, $0\leq y\leq0.6$, and $1\leq n\leq1.5$. M is selected from Fe, Mn, V, and Co. M' is selected from at least one of Mg, Ti, Cr, V and Al. X' is selected from at least one of S, P and Si. According to one embodiment, the cathode active material 14 comprises $LiFePO_4$.

In the current lithium battery industry, almost all cathode materials are doped, coated, or modified by various methods. However, doping, coating and other modifications cause the chemical formula of the material to be more complex. For example, $LiMn_2O_4$ is no longer able to represent the general formula of a "lithium manganese oxide" that is widely used. Strictly, the formula $LiMn_2O_4$ should include the spinel structure cathode materials of a variety of modifications, and be consistent with the general formula $Li_{1+x}Mn_yM_zO_k$. Similarly, the chemical formula of $LiCoO_2$ and $LiFePO_4$ described herein, will be understood to include the materials of a variety of modifications and to be consistent with the general formula $Li_xM_{1-y}M'_y(XO_4)_n$ and $Li_{1+x}M_yM'_zM''_cO_{2+n}$.

In a preferred embodiment, according to the present invention, when the cathode active material 14 is a lithium ion intercalation-deintercalation compound, it can be selected from, for example, $LiMn_2O_4$, $LiFePO_4$, $LiCoO_2$, $LiM_xPO_4$, $LiM_xSiO_y$ (where M is a metal with a variable valence) and other compounds; when the cathode active material 14 is a sodium ion intercalation-deintercalation compounds, it can be, for example, $NaVPO_4F$; when the cathode active material 14 is a zinc ion intercalation-deintercalation compounds, it can be, for example, $MgM_xO_y$ (M is a metal, wherein $0.5<x<3$, $2<y<6$). Any ion or functional group intercalated-deintercalated compound could be used as the cathode active material 14 in the present invention.

According to one embodiment, when preparing cathode slurry, conductive agent and binder should be added therein except for cathode active material 14.

The conductive agent is selected from at least one of conductive polymer, active carbon, graphene, carbon black, carbon fiber, metal fiber, metal powder, or metal sheet.

The binder is selected from one of Polyethylene oxide, polypropylene oxide, polyacrylonitrile, polyimides, polyesters, polyethers, fluorinated polymers, polydivinyl polyethylene glycol, polyethylene glycol diacrylate, polyethylene glycol dimethacrylate, or a combination thereof and derivatives. In one embodiment, the binder is polytetrafluoroethylene(PTFE) or polyvinylidene fluoride (PVDF).

The cathode current collector 12 served as a carrier of electronic conduction and collection does not participate in the electrochemical reaction. Within the operating potential window of the battery, the cathode electrode collector 12 can be stable in the liquid electrolyte and no side reactions occur, which ensure the stable cyclic performance of battery. The cathode current collector 12 is selected from one of carbon based material, a metal or alloy.

According to one aspect of the invention, the carbon based material is selected from one of glassy carbon, graphite, carbon felt, carbon fiber, or 3D bicontinous conductive materials, wherein the 3D bicontinous conductive materials comprise but not limited to carbon foam; the graphite comprises but not limited to graphite foil and graphite plate.

According to one aspect of the present invention, the metal is selected from one of Al, Fe, Cu, Pb, Ti, Cr, Mo, Co, Ag or passivated metal thereof.

According to one aspect of the present invention, the alloy is selected from one of stainless steel, Al alloy, Ni alloy, Ti alloy, Cu alloy, Co alloy, Ti—Pt alloy, Pt—Rh alloy, or passivated alloy thereof. Stainless steel include stainless steel foil or stainless steel net, specifically, the mode of stainless steel can be but not limited to 300 series stainless steel, such as stainless steel 304, 316, 316L or 316P. The mode of Al alloy models can be but not limited to Al alloy 6000 series, such as aluminum alloy 6061.

The anode 20 only comprises an anode current collector 22 that is served as a carrier of electronic conduction and collection, the anode current collector 22 does not participate in the electrochemical reaction.

According to one aspect of the invention, the material of the anode current collector 22 may comprise at least one metal selected from Ni, Cu, Ag, Pb, Sn, Fe, Al or a passivated metal thereof, or silicon, or carbon based material. The carbon based materials includes graphite materials, such as commercial graphite pressed foil, wherein graphite weight rate is in the range of 90-100%. The material of the anode current collector 22 can be stainless steel or passivated stainless steel, similarly, the mode of stainless steel can be but not limited to 300 series stainless steel, such as stainless steel 304, 316, 316L or 316P.

In addition, the material of the anode current collector 22 can be selected from a metal with electroplating layer or coating layer of high hydrogen potential, which is selected at least one of C, Sn, In, Ag, Pb, Co, or an alloy thereof, or an oxide thereof. The thickness range of the electroplating layer or coating layer is 1-1000 nm, such as copper or graphite foil coated with tin, lead or silver.

The main purpose of passivating the cathode current collector 12 or the anode current collector 22 is to form a passivated oxide film thereon, so that the cathode current collector 12 or the anode current collector 22 does not participate in electrochemical reaction during the process of battery charging and discharging, which ensures the stability of battery in the present invention. The method includes chemical or electrochemical passivation.

Chemical passivation includes oxidization through oxidizing agent. The oxidizing agent should satisfy the requirement of making the current collector to form a passivation film without dissolving the current collector. Oxidizing agent is selected from but not limited to concentrated nitric acid and ceric sulphate ($Ce(SO_4)_2$).

Specifically, the process of chemical passivation includes the following steps: putting current collector in oxidizing agent, maintaining for 0.5-1 hours for formation of passivation film, following this getting the current collector cleaned and dried.

According to one embodiment, the process of chemical passivation includes the following steps: preparing 20% $HNO_3$ solution, controlling the temperature at 50□, putting stainless steel mesh or foil in and maintaining for half an hour, then taking out stainless steel, washing with water and drying.

According to one embodiment, the process of chemical passivation includes the following steps: preparing 0.75 mol/L $Ce(SO_4)_2$ solution, putting stainless steel mesh or foil in, maintaining for half an hour, then taking out stainless steel, washing with water and drying.

According to one embodiment, the process of electrochemical passivation includes the following steps: charging and discharging of the current collector or battery with current collector to form a passivation film thereon.

The current collector can be pre-passivated before battery assembly. According to one embodiment, the current collector served as working electrode is charged and discharged in the three electrodes system with proper reference electrode and counter electrode, the cut-off voltage of charging and discharging process is 2.35-2.45V and 1.35-1.45V respectively. The current collector can be metal, such as aluminum, alloys (e.g. stainless steel or aluminum alloy). Of course, two electrodes system could be utilized for passivation with the cut-off voltage of charging and discharging at 2.35-2.45V and 1.35-1.45V respectively.

According to one embodiment of directly passivation of Al alloy current collector, the three electrodes system are charged and discharged comprising Al alloy served as working electrode and Zn foil served as counter and reference electrode, 1.5 mol/L Zinc acetate and 3 mol/L lithium acetate as electrolyte. The cut-off voltage of charging and discharging are 1.4 V and 2.4 V. A passivation film is formed on the surface of Al alloy at 2.4V.

The current collector can be passivated after battery assembly. The cut-off voltage of charging and discharging are 1.35-1.45 V and 2.35-2.45V, the battery is charged and discharged no less than once. The current collector can be metal, such as Al, or Alloy, such as stainless steel or Al alloy.

According to one embodiment of directly passivation of battery, the cathode active material 14 is $LiMn_2O_4$, the cathode current collector 12 is Al alloy, the anode current collector 22 is copper foil, electrolyte is an aqueous solution containing 1.5 mol/L zinc acetate and 3 mol/L acetate, the cut-off charging voltage is 2.4V under which the surface of aluminum alloy is oxidized and a passivation film formed thereon. The cut-off discharging voltage is 1.4V; the battery is charged and discharged no less than once. The more cycles the battery is charged and discharged, the better passivated effect aluminum alloy can get.

In the process of electrochemical passivation of aluminum alloy, the corrosion current of aluminum alloy will dramatically decrease after extended charging cycles. Specifically, control the charging voltage at 2.4V for an extended time range, from 10 minutes to 1 hour, the corrosion current of aluminum alloy will decrease remarkably; the decline of corrosion current is not obvious when extended time from 1 hour to 24 hours. As to the optimal oxidation time, it is longer than 1 h at 2.4V.

The electrolyte is a weak acid or neutral aqueous solution, containing solute such as chloride, sulphate, nitrate, acetate, formate or phosphate. Within the operating potential window of the battery, the cathode electrode collector 12 and anode current collector 22 can be stable in the liquid electrolyte and no side reactions occur, thus ensuring the battery has stable cyclic performance. The method of passivation provided in the present invention is both suitable for the cathode electrode collector 12 and anode current collector 22.

In order to make the active ion 28 in the electrolyte deposit more uniformly on the surface of anode 20, a porous layer 30 is pre-formed on the surface of anode 20 by any suitable means such as coating or pressing.

The thickness range of the porous layer 30 is 0.05-1 mm, porous layer 30 has a micron or sub-micron or nano-pores, the volume rate range of micron or sub-micron pores in the porous layer 30 is 50-95%, while the volume rate range of the nano pores is 10-99%, the average diameter range of nano pores is 1-999 nm, preferably 1-150 nm.

Porous layer 30, which can provide large specific surface area for the deposition of active ions 28 during the charge cycle, is not involved in the electrochemical reaction 20. So the deposition of active ions 28 on the anode current collector 22 is more uniform and the dendrite of anode 20 is effectively restrained. Moreover, active ions 28 only need to migrate a short distance for the charging and discharging process, which solves the problem of diffusion resistance of active ions 28. Meanwhile, since the anode 20 is provided with a porous layer 30, a thinner separator can be suitable for the battery, thus oxygen generated in charging process, in particular overcharging process, can migrate more easily to the anode 20 for reduction which may enhance the reversibility of battery.

Porous layer 30 comprises at least one carbon-based material selected from carbon black, active carbon, carbon nanotube, carbon fiber, or graphite.

Carbon black comprises but not limited to Ketjen black (KB) and acetylene black. KB with a high specific surface area and strong adsorption capacity can make active ions 28 deposit more uniformly on the anode electrode 20, and the battery's electrochemical performance can be improved at large charging and discharging current due to good conductivity of KB.

Porous layer 30 comprises a carbon-based material, the carbon-based material can be a mixture of active carbon powder and binder, the weight rate range of the active carbon powder in porous layer is 20-99%. The specific surface area range of active carbon is 200-3000 $m^2/g$. Specifically, the commercial active carbon powder (particle size 1-200 mm) and polyvinylidene fluoride (PVDF) is uniformly mixed in solvent N-methyl pyrrolidone (NMP), the resulting slurry is coated on the surface of anode current collector 22. The thickness of porous layer 30 is 0.1-0.2 mm; NMP in resulting slurry is in the range of 50-70% by weight.

The morphology of active carbon include but not limited to active carbon powder, active carbon particle, active carbon felt, or active carbon fiber cloth, the specific surface area of active carbon felt or active carbon fiber cloth is 100-2200 $m^2/g$.

According to one embodiment, active carbon particle and conductive graphite are mixed uniformly in the presence of PVDF and NMP, the resulting slurry is coated on the surface of anode current collector 22, the role of conductive graphite is to improve the conductivity of porous layer 30. The thickness of porous layer 30 is 0.1-0.2 mm, the active carbon in porous layer 30 is in the range of 20-80% by weight, while conductive graphite is 5-15% and PVDF is 5-15%. That activated carbon with porous structure, high specific surface area, lower cost and simple manufacturing process make the battery in the present invention more suitable for industrialization.

Preferably, anode 20 comprises a graphene layer formed thereon. Graphene has outstanding thermal and mechanical properties with the theoretical specific surface area of 2600 $m^2/g$ and high electron mobility in room temperature, therefore, the graphene layer formed on the anode 20 not only provides greater deposition area for active ion 28, but also improves the electron conductivity of anode, which improve the electrochemical performance of the battery in large current charging and discharging process.

According to the first embodiment, a porous layer or graphene layer is formed on the surface of anode current collector, for the anode 20 only comprises anode current collector 22.

The electrolyte comprises at least one solvent capable of dissolving solute, the solvent is preferably an aqueous solution. By way of example, the electrolyte may comprise water, ethanol, methanol, or mixtures thereof.

Solute in electrolyte can be ionized to at least an active ion 28 that can be reduced to a metallic state during the charge cycle and oxidized from the metallic state to the dissolved ion state during the discharge cycle.

The concentration of active ions 28 in electrolyte is 0.5-15 mol/L. According to one embodiment, active ions 28 comprise at least one metal ions, the metal is selected form Zn, Fe, Cr, Cu, Mn, Ni, Sn or mixture thereof. Metal ion is in the form of at least one of chloride, sulphate, nitrate, acetate, formate, phosphate in electrolyte; preferably, metal ions is in the form of sulphate, acetate or mixtures thereof in the electrolyte.

Preferably, electrolyte comprises a solute that can be ionized to at least an intercalation-deintercalation ions 16 that can deintercalate from cathode 10 during the charge cycle and intercalate into cathode 10 during the discharge cycle, which may improve the exchange rate of the cathode active material 14 and ions in electrolyte and improve the rate capability of battery in the present invention. More specifically, when the cathode active material 14 is a lithium ion intercalation-deintercalation compound, lithium ion is included in the electrolyte correspondingly. The intercalation-deintercalation ion 16 comprises Li ion, Na ion, Mg ion, or Zn ion, with concentration range in electrolyte is 0.1-30 mol/L.

To ensure the battery capacity, the concentration of active ions 28 in electrolyte must reach a certain range, when overly alkaline electrolyte will affect the solubility of active ion 28, and overly acid electrolyte may cause the corrosion of the electrode material and co-embedment of proton, therefore, the pH range of electrolyte in the present invention is of 3-7.

Figure 2:
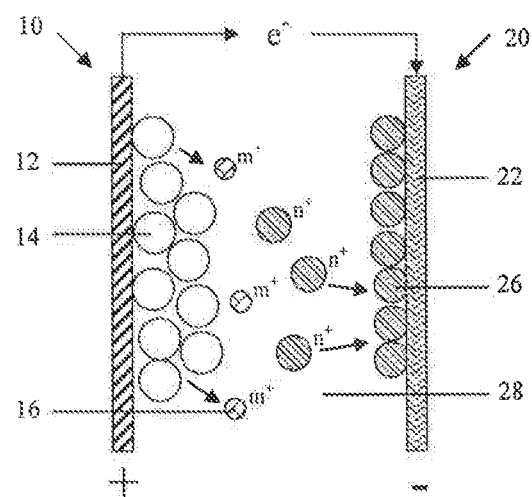
FIG. 2 schematically shows charging process of battery in the first embodiment.
Figure 3:
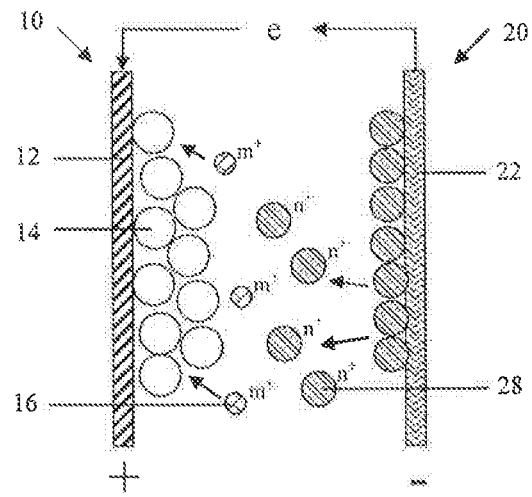
FIG. 3 schematically shows discharging process of battery in the first embodiment.

As shown in FIG. 2, Without being restricted to any theory, the working principle of the present battery may be summarized as follows: during the charging process, the intercalation-deintercalation ions 16 inside the cathode active material 14 deintercalate into the electrolyte, while, simultaneously, the metal ions in the electrolyte are reduced and deposited onto the surface of the anode 20. The discharging process reverses the reactions of the charging process as shown in FIG. 3.

According to the first embodiment, the first operation of the battery is a charging process that the intercalation-deintercalation ions 16 inside the cathode active material 14 deintercalate into the electrolyte, while the metal ions in the electrolyte are reduced and deposited onto the surface of the anode 20. Battery capacity depends on the capacity of cathode active material 14, therefore, the cathode active material 14 needs to contain sufficient intercalation-deintercalation ions 16 in the first charge cycle. The battery cannot be used unless it is charged prior to use, which ensures the capacity of the battery and prevents from any form of capacity loss.

Embodiment 2

Figure 4:
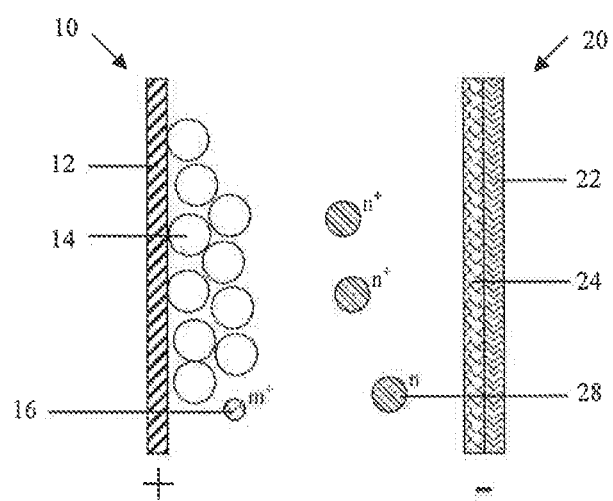
FIG. 4 schematically shows battery structure in the second embodiment.

As shown in FIG. 4, The second embodiment of the present invention provides a battery, the typical difference of battery in embodiment 1 and 2 is: anode 20 in the second embodiment further comprises an anode active material formed on the anode current collector 22, which can be oxidized and dissolved to the active ion state during the discharging process.

The anode current collector 22 served as a carrier of electronic conduction and collection does not participate in the electrochemical reaction. Anode active material 24 is formed on the anode current collector 22 by the means of coating, electroplating or sputtering. The method of sputtering includes but not limited to magnetron sputtering, in specific, anode current collector 22 is Cu foil, anode active material 24 is Zn, Zn is formed on the surface of Cu foil by electroplating.

Preferably, the anode active material 24 is formed on the surface of anode current collector 24 being suffered a surface pre-treatment; the surface pre-treatment is selected from at least one of mechanical, chemical or electrochemical treatment. Specifically, when the anode current collector 22 is Cu, the pre-treatment can be manual or mechanical grinding to remove the dim part and make its surface rough. Because the impurities, such as CuO, on the surface of Cu cannot be completely removed by manual grinding, further chemical treatment may be required for Cu, methods of chemical treatment can be soaking in different acids or their mixtures, such as sulfuric acid, nitric acid or hydrochloric acid. The method of pre-treatment depends on the material of anode current collector 22, usually includes the combination of mechanical, chemical and electrochemical treatment.

According to embodiment 2, anode 20 comprises an anode current collector 22 and an anode active material 24. A porous layer or graphene layer is formed on the surface of anode current collector 22, anode active material 24 is formed on the porous layer or graphene layer by the means of coating, electroplating or sputtering.

Cathode 10 comprises a cathode active material 14 and a cathode current collector 12 that is not involved in the electrochemical reaction. Cathode active material 14 is a lithium ion, sodium ion, zinc ion or magnesium ion intercalation-deintercalation compound. But in the embodiment 2, it does not matter whether cathode active material 14 contains lithium ion, sodium ion, zinc ion or magnesium ion, in detail, there are four kinds of cathode active material 14, which are: 1) cathode active material 14 having no intercalation-deintercalation ions 16 therein; 2) cathode active material 14 having intercalation-deintercalation ions 16 and unoccupied interstitial sites in the crystal structure; 3) cathode active material 14 having intercalation-deintercalation ions 16 and no unoccupied interstitial sites in the crystal structure; 4) cathode active material 14 having over-intercalated intercalation-deintercalation ions 16.

The electrolyte comprises at least one solvent capable of dissolving solute, the solvent is preferably an aqueous solution. By way of example, the electrolyte may comprise water, ethanol, methanol, or mixtures thereof.

The electrolyte comprises at least one solvent capable of dissolving solute, the solute can be ionized to at least an active ions that can be reduced to a metallic state during the charge cycle and oxidized from the metallic state to the dissolved ion state during the discharge cycle and/or at least an intercalation-deintercalation ions that can deintercalate from the cathode active material during the charge cycle and intercalate into the cathode active material during the discharge cycle.

According to the battery of embodiment 2, cathode active material 14 is capable of reversibly intercalating and deintercalating ions, as mentioned above, there are four kinds of cathode active material 14, which are: 1) cathode active material 14 having no intercalation-deintercalation ions 16 therein; 2) cathode active material 14 having intercalation-deintercalation ions 16 and unoccupied interstitial sites in the crystal structure; 3) cathode active material 14 having intercalation-deintercalation ions 16 and no unoccupied interstitial sites in the crystal structure; 4) cathode active material 14 having over-intercalated intercalation-deintercalation ions 16. Thus, there are a lot of options for cathode active material 14, and further, electrolyte comprises active ions 28 and/or intercalation-deintercalation ions 16, the operation mode of battery with great adaptability in the present invention can be chosen according to different applications. Now the operation mode of battery comprising different cathode active material 14 and electrolyte will be further elaborated.

According to one aspect of the present invention, a battery comprises a cathode 10, an anode 20, and an electrolyte. The cathode 10 comprises a cathode current collector 12 and a cathode active material 14 which is capable of reversibly intercalating-deintercalating ions; The anode 20 comprises an anode current collector 22 and an anode active material 24 that participate in the electrochemical reaction; The electrolyte comprises at least one solvent capable of dissolving solute, solute being ionized to at least an intercalation-deintecalation ions 16 that can deintercalate from the cathode active material 14 during the charge cycle and intercalate into the cathode active material 14 during the discharge cycle. The cathode active material 14 contains no intercalation-deintecalation ions 16. The first operation mode of the battery is a discharge process that the intercalation-deintecalation ions 16 in electrolyte intercalate into the cathode active material 14 and the anode active material 24 is oxidized and dissolved to the active ions 28.

More specifically, the cathode active material 14 is $Mn_2O_4$, the anode active material is metal Zn, and the electrolyte contains LiAc. Cathode active material 14 contains no Li, but electrolyte contains Li ions, the first operation mode of the battery is a discharging process that Li ions in electrolyte intercalate into $Mn_2O_4$ and anode active material Zn is oxidized to $Zn^{2+}$.

Preferably, electrolyte further comprises an active ion 28 which can be reduced to a metallic state during the charge cycle and oxidized from the metallic state to the dissolved ion state during the discharge cycle, which may improve the exchange rate of anode active material 20 and ion in electrolyte.

The battery can work as long as that the cathode active material 14 is capable of reversibly intercalating and deintercalating intercalation-deintecalation ions 16 without being restricted having them. The battery must undergo a discharging process firstly, for the cathode active material 14 contains no intercalation-deintecalation ions 16, the battery can be directly used with a long served life.

According to one aspect of the present invention, a battery comprises a cathode 10, an anode 20 and an electrolyte. The cathode 10 comprises a cathode current collector 12 and a cathode active material 14 which is capable of reversibly intercalating-deintercalating ions; The anode 20 comprises an anode current collector 22 and an anode active material 24 that participate in the electrochemical reaction; The electrolyte comprises at least one solvent capable of dissolving solute, solute being ionized to at least an active ions 28 that can be reduced to a metallic state during the charge cycle and oxidized from the metallic state to the dissolved ion state during the discharge cycle and at least an intercalation-deintercalation ions 16 that can deintercalate from the cathode active material 14 during the charge cycle and intercalate into the cathode active material during the discharge cycle. The first operation mode of the battery is a discharging process that intercalation-deintecalation ions 16 in electrolyte intercalate into the cathode active material 14 and the anode active material 24 is oxidized and dissolved to the active ions 28 or a charging process that intercalation-deintecalation ions 16 deintercalate from the cathode active material 14 and active ions 28 in electrolyte is reduced from ion state to metal and deposited on the anode.

More specifically, cathode active material 14 is $Li_{1-x}Mn_2O_4$, anode active material is metal Zn, and electrolyte contains LiAc and $Zn(Ac)_2$. $Li^+$ can be intercalated into or deintercalated from $Li_{1-x}Mn_2O_4$, thus, the first operation mode of the battery can be a discharging process that: $Li^+$ in electrolyte intercalate into $Li_{1-x}Mn_2O_4$ and Zn is oxidized to $Zn^{2+}$, or a charging process that $Li^+$ deintercalate from $Li_{1-x}Mn_2O_4$ and $Zn^{2+}$ in electrolyte is reduced and deposited on the anode to form an active ion deposition layer 26 Zn.

The battery with a long cycle life can be used directly. The first operation mode of the battery can be a charging or discharging process and a charging process will be preferable.

According to one aspect of the present invention, a battery comprises a cathode 10, an anode 20, and an electrolyte. The cathode 10 comprises a cathode current collector 12 and a cathode active material 14 which is capable of reversibly intercalating-deintercalating ions; The anode 20 comprises an anode current collector 22 and an anode active material 24 that participates in the electrochemical reaction; The electrolyte comprises at least one solvent capable of dissolving solute, solute being ionized to at least an intercalation-deintercalation ions 16 that can deintercalate from the cathode active material 14 during the charge cycle and intercalate into the cathode active material 14 during the discharge cycle. The first operation mode of the battery is a discharging process that intercalation-deintecalation ions 16 in electrolyte intercalate into the cathode active material 14 and the anode active material 24 is oxidized and dissolved to active ions 28.

More specifically, cathode active material 14 is $Li_{1-x}Mn_2O_4$, anode active material is metal Zn, and electrolyte contains LiAc. $Li^+$ can be intercalated into or deintercalated from $Li_{1-x}Mn_2O_4$ while $Li^+$ exists in electrolyte, thus, the first operation mode of battery is a discharging process that $Li^+$ deintercalate from $Li_{1-x}Mn_2O_4$ and $Zn^{2+}$ in electrolyte is reduced and deposited on the anode to form an active ion deposition layer Zn.

The battery that must undergo a discharging process firstly can be directly used with a long cycle life and good performance.

According to one aspect of the present invention, a battery comprises a cathode 10, an anode 20, and an electrolyte. The cathode 10 comprises a cathode current collector 12 and a cathode active material 14 which is capable of reversibly intercalating-deintercalating ions; The anode 20 comprises an anode current collector 22 and an anode active material 24 that participates in the electrochemical reaction; The electrolyte comprises at least one solvent capable of dissolving solute, solute being ionized to at least an active ions 28 that can be reduced to a metallic state during the charge cycle and oxidized from the metallic state to the dissolved ion state during the discharge cycle. The first operation mode of the battery is a charging process that intercalation-deintercalation ions 16 deintercalate from the cathode active material 14 and the active ions 28 in electrolyte is reduced from ion state to metal and deposited on the anode 20.

More specifically, cathode active material 14 is $Li_{1-x}Mn_2O_4$, anode active material is metal Zn, and electrolyte contains $Zn(Ac)_2$. $Li^+$ can be intercalated into or deintercalated from $Li_{1-x}Mn_2O_4$, thus, the first operation mode of the battery is a charging process that: $Li^+$ in electrolyte intercalate into $Li_{1-x}Mn_2O_4$ and Zn is oxidized to $Zn^{2+}$.

According to one aspect of the present invention, a battery comprises a cathode 10, an anode 20, and an electrolyte. The cathode 10 comprises a cathode current collector 12 and a cathode active material 14 which is capable of reversibly intercalating-deintercalating ions; The anode 20 comprises an anode current collector 22 and an anode active material 24 that participates in the electrochemical reaction; The electrolyte comprises at least one solvent capable of dissolving solute, solute being ionized to at least an active ions 28 that can be reduced to a metallic state during the charge cycle and oxidized from the metallic state to the dissolved ion state during the discharge cycle. The cathode active material 14 comprises intercalation-deintercalation ions 16 and has no unoccupied interstitial sites in the crystal structure therein. The first operation mode of the battery is a charging process that intercalation-deintecalation ions 16 deintercalate from the cathode active material 14 and the active ions 28 in electrolyte are reduced from ion state to metal and deposited on the anode 20.

As known to skilled person, there are no unoccupied interstitial sites in the crystal structure of the cathode active material 14 that could ensure the stability of cathode active material 14 and battery.

The battery that must undergo a charging process firstly that intercalation-deintecalation ions 16 deintercalate from the cathode active material 14 and the active ions 28 in electrolyte is reduced from ion state to metal and deposited on the anode 20. That the battery must be charged firstly prior to use ensure no loss of capacity and cycle performance thereafter.

Preferably, electrolyte further comprises at least an intercalation-deintercalation ions 16 that can deintercalate from the cathode active material 14 during the charge cycle and intercalate into the cathode active material 14 during the discharge cycle, which may improve the exchange rate of cathode active material 10 and ions in electrolyte.

The battery can work as long as that electrolyte comprises active ions 28 without being restricted having intercalation-deintercalation ions 16. The battery is of low cost and broad application prospect, benefit in the simple composition of electrolyte.

According to one aspect of the present invention, a battery comprises a cathode 10, an anode 20, and an electrolyte. The cathode 10 comprises a cathode current collector 12 and a cathode active material 14 which is capable of reversibly intercalating-deintercalating ions; The anode 20 comprises an anode current collector 22 and an anode active material 24 that participates in the electrochemical reaction; The electrolyte comprises at least one solvent capable of dissolving solute, solute being ionized to at least an active ions 28 that can be reduced to a metallic state during the charge cycle and oxidized from the metallic state to the dissolved ion state during the discharge cycle. The first operation mode of the battery is a charging process that intercalation-deintecalation ions 16 deintercalate from the cathode active material 14 and active ions 28 in electrolyte is reduced from ion state to metal and deposited on the anode 20.

As known to skilled person, to improve the capacity of cathode active material 14, further intercalation could be done to the cathode active material 14 when there is no unoccupied interstitial sites in the crystal structure therein, which may cause structure unstable. In order to assure the stability of structure, the cathode active material 14 is modified or coated with some kind of metal or metal oxide, such as Al or $Al_2O_3$.

More specifically, cathode active material 14 is $Li_{1+x}Mn_2O_4$ coated with $Al_2O_3$ (0<x<0.5), anode active material is metal Zn, and electrolyte contains $Zn(Ac)_2$. $Li^+$ in cathode active material 14 is over-intercalated, thus, the first operation mode of the battery is a charging process that: $Li^+$ in electrolyte intercalate into $Li_{1-x}Mn_2O_4$ and Zn is oxidized to $Zn^{2+}$.

Preferably, electrolyte further comprises at least an intercalation-deintercalation ions 16 that is capable of deintercalating from the cathode active material 14 during the charge cycle and intercalating into the cathode active material 14 during the discharge cycle, which may improve the exchange rate of cathode active material 10 and ions in electrolyte.

According to the battery in embodiment 2, anode 20 comprises an anode current collector 22 and an anode active material 24 that participates in the electrochemical reaction. There are many options for first operation mode of battery. Different operation modes of battery can be made according to different application by different composition of cathode 10, anode 20, and electrolyte.

Embodiment 3

The third embodiment of the present invention provides a battery, the typical difference of battery in embodiment 3 and 2 is: anode 20 in the embodiment 3 only comprises an anode current collector 22, which is not served as a carrier for electron conduction and collection, but also participating in anode reaction as anode active material. Anode current collector can be oxidized and dissolved to active ion state during the discharge cycle, such as active ion 28 is $Zn^{2+}$, anode current collector is Zn correspondingly.

In embodiment 3, anode 20 comprises an anode current collector that participates in electrochemical reaction, a porous layer or graphene layer is formed on the surface of anode current collector. More specifically, cathode active material is $LiMn_2O_4$, cathode current collector 12 is stainless steel net, anode current collector 22 is Zn, and electrolyte comprises water solution with Zn salt. Preferably, electrolyte comprises Zn salt and Li salt. Metal Zn can participate in the anode reaction.

In one aspect of the invention, a separator may be provided with the battery structure. In such case, the separator may comprise an organic or inorganic porous material. In one aspect, the separator has a porosity of 20-95% and includes pores having a pore size of 0.001-100 µm.

The present invention provides a battery with high energy density (up to a lithium ion battery 60%-80%), high power density (up to lithium-ion battery 200% or even higher), easy to manufacture, completely non-toxic, environmentally friendly, easy to recycle and low cost (the same battery capacity, is expected to reach 60% of lead-acid batteries, lithium-ion battery to 20% or less), etc., and with good cycling performance, in a specific embodiment, the capacity of battery remains at 90% after 4000 cycles. Accordingly, as a new generation of green energy, the battery in the present invention is very qualified to be used as an energy storage system in the field of large-scale storage and as a substitute for lead-acid battery.

All features described herein can be replaced by features that can provide the same, equal or similar purpose. Therefore, unless otherwise stated, the features revealed are only the general features of equal or similar examples.

As will be understood by persons skilled in the art after having reviewed the present description, the main advantages offered by the present invention include one or more of: improved cycleability; environmentally safe (due to the lack of potentially environmentally harmful components); and low cost of production.

Aspects of the present invention are described below by means of various illustrative examples. The examples contained herein are not intended to limit the invention in any way but to illustrate same in more detail. It should be understood that the experiments in the following examples, unless otherwise indicated, are in accordance with conditions as would be known to persons skilled in the art or the conditions recommended by manufacturers. Unless indicated otherwise, all percentages, ratios, proportions referred to in the examples are calculated by weight.

EXAMPLES

Example 1

The stability of different current collector in various electrolytes is tested by cyclic voltammetry (CV) through three-electrode system.

Example 1-1

In a three-electrode system, stainless steel (SS304) is used as working electrode, and Zn is used as counter and reference electrode. The electrochemical behaviour of un-passivated SS304 in electrolyte containing 2 mol/L $ZnSO_4$ and 2 mol/L $Li_2SO_4$ is studied by CV.

Figure 5:
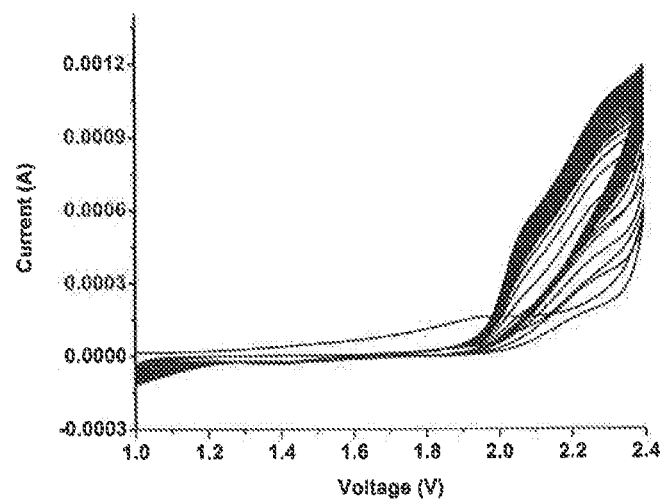
FIG. 5 is a cyclic voltammetry curve of un-passivated SS304 in sulphate electrolyte in example 1-1.

Cyclic voltammetry curves of un-passivated SS304 in embodiment 1-1 are shown in FIG. 5. For the first anodic scanning on SS, there is a wide oxidation peak at 1.9V (Vs. Zn electrode), then appear a significant $O_2$ evolution peak at large current. In the following cathodic scanning, there is a relatively small reduction peak appearing at 1.4V, which kept at that potential in the following cycles. It seems that the oxidation peak at 1.9V and the reduction peak at 1.4V form a redox couple and are reversible. This redox couple might be the oxidation and reduction of metal or the absorption of some ions with the $O_2$ evolution. The oxidation at 1.9V get hindered after the first cycle, it means that the oxidation layer formed in the first cycle can inhibit the further oxidation of the metal under the surface. But this oxide layer might incite the $O_2$ evolution. As a result, the significant $O_2$ evolution peak shifts to lower potential and becomes larger and larger.

Example 1-2

In a three-electrode system, passivated stainless steel (SS316) is used as working electrode, and Zn is counter and reference electrode. The electrochemical behaviour of passivated SS316 in electrolyte containing 2 mol/L $ZnSO_4$ and 2 mol/L $Li_2SO_4$ is studied by CV at the voltage range 1.0-2.4V SS316 is passivated by chemical method. More specifically, the chemical method includes the following steps: preparing 20% $HNO_3$ solution, controlling the temperature at 50° C., putting SS316 in and maintaining for half an hour in order to form a passivation film. Taking out SS, washing with water and drying.

Figure 6:
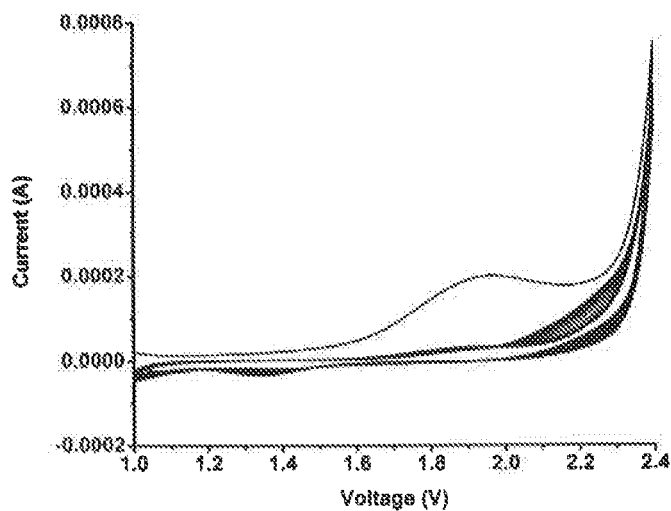
FIG. 6 is a cyclic voltammetry curve of passivated SS316 in sulphate electrolyte in example 1-2.

Cyclic voltammetry curves of passivated SS316 in embodiment 1-2 are shown in FIG. 6. After being passivated in solution with concentrated $HNO_3$, SS316 becomes more stable. The $O_2$ evolution curves become reproducible and there is no significant difference for different cycles. On the other hand, the initial $O_2$ evolution potential shifts slightly to higher potential and no $O_2$ evolution is observed before 2.0V. This is extremely important for the aqueous battery, for the passivated stainless steel is stable within the operation voltage range of battery.

Example 1-3

In a three-electrode system, passivated stainless steel (SS316P) is used as working electrode, and Zn is counter and reference electrode. The electrochemical behaviour of passivated SS316P in electrolyte containing 3 mol/L $Zn(NO_3)_2$ and 6 mol/L $LiNO_3$ is studied by CV at the voltage range 1.0-2.4V. The passivation method of SS316P is the same as that of embodiment 1-2.

Figure 7:
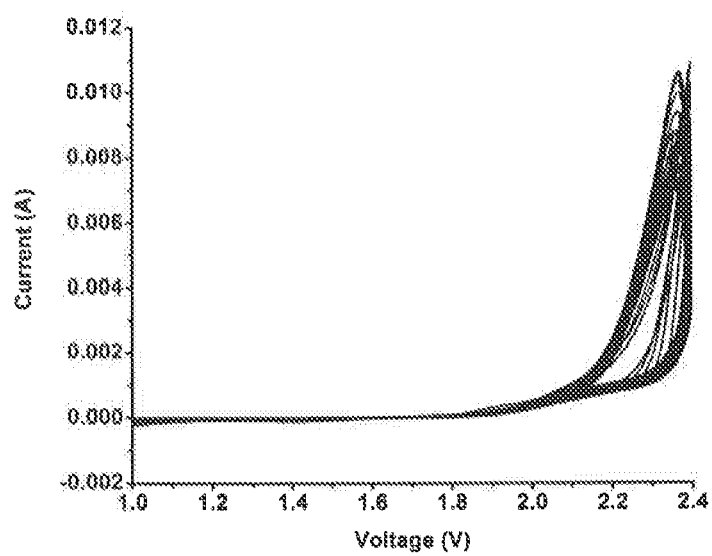
FIG. 7 is a cyclic voltammetry curve of passivated SS316P in nitrate electrolyte in example 1-3.

Cyclic voltammetry curves of passivated SS316P in nitrate electrolyte of embodiment 1-3 are shown in FIG. 7.

Example 1-4

In a three-electrode system, Al alloy is used as working electrode, and Zn is counter and reference electrode. The electrochemical behaviour of Al alloy in acetate electrolyte containing 1.5 mol/L $Zn(Ac)_2$ and 3 mol/L LiAc is studied by CV at the voltage range 1.0-2.4V. Charge the three-electrode system to 2.4V for several cycles to passivate the Al alloy.

Example 1-5

In a three-electrode system, Al alloy is used as working electrode, and Zn is counter and reference electrode. The electrochemical behaviour of Al alloy in sulphate electrolyte containing 2 mol/L $ZnSO_4$ and 2 mol/L $Li_2SO_4$ is studied by CV at the voltage range 1.0-2.4V. Charge the three-electrode system to 2.4V for several cycles to passivate the Al alloy.

Figure 8:
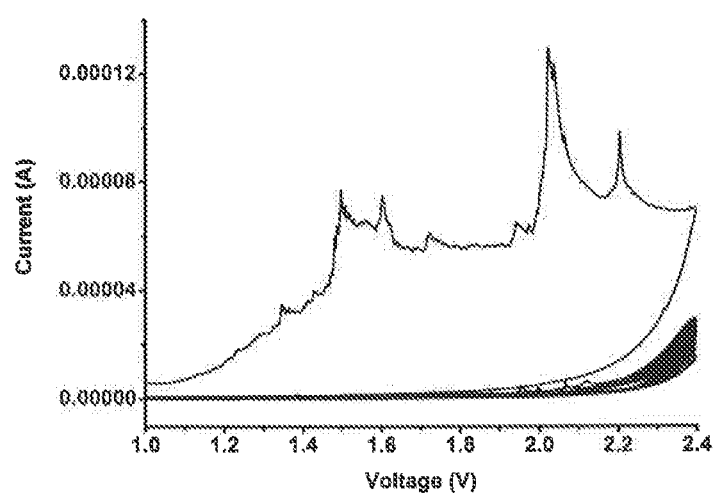
FIG. 8 is a cyclic voltammetry curve of passivated Al alloy in acetate electrolyte in example 1-4.
Figure 9:
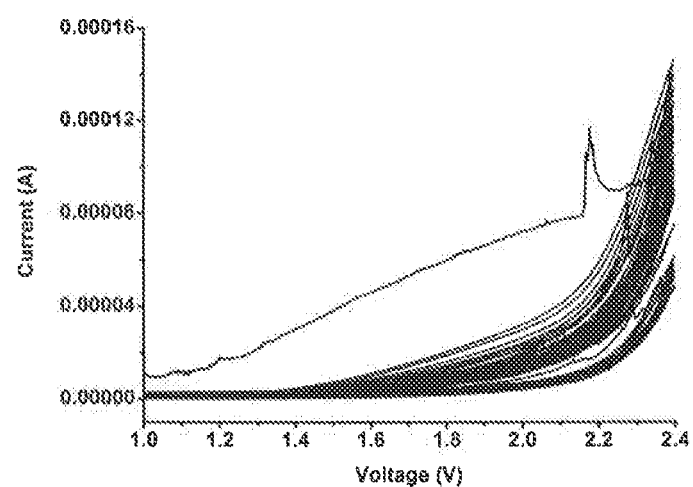
FIG. 9 is a cyclic voltammetry curve of passivated Al alloy in sulphate electrolyte in example 1-5.

Cyclic voltammetry curves of passivated Al alloy in nitrate electrolyte of embodiment 1-4 and in sulphate electrolyte of embodiment 1-5 are shown in FIGS. 8 and 9, respectively. In FIG. 8, it does show significant oxidation peak during the first anodic scanning, but the current fluctuates a little. It might come from the oxidation of Al alloy on the surface or a non-faradic current from ions absorption or other process. The surface of Al alloy is oxidized at 2.4V to form a passivation film thereon, after the first anodic scanning, no peaks appear within the voltage range of 1.0-2.1V. The significant $O_2$ evolution potential shifts to higher potential and the $O_2$ evolution current becomes smaller. Thus, the electrochemical oxidation might be used to stabilize the Al alloy surface to inhibit the $O_2$ evolution at high potential.

Example 1-6

In a three-electrode system, graphite foil is used as working electrode, and Zn is counter and reference electrode. The electrochemical behaviour of graphite foil in chloride electrolyte containing 4 mol/L $ZnCl_2$ and 3 mol/L LiCl is studied by CV.

Example 1-7

In a three-electrode system, un-passivated stainless steel is used as working electrode, and Zn is counter and reference electrode. The electrochemical behaviour of un-passivated stainless steel in chloride electrolyte containing 4 mol/L $ZnCl_2$ and 3 mol/L LiCl is studied by CV.

Figure 10:
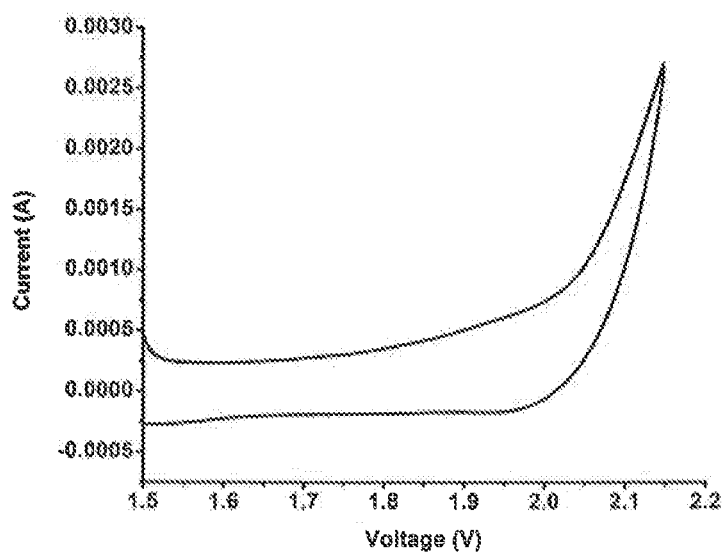
FIG. 10 is a cyclic voltammetry curve of graphite foil in chloride electrolyte in example 1-6.
Figure 11:
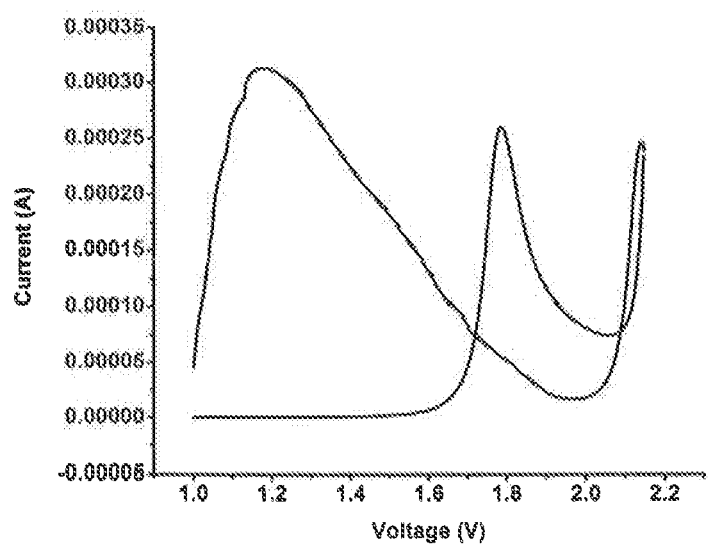
FIG. 11 is a cyclic voltammetry curve of un-passivated SS in chloride electrolyte in example 1-7.

Cyclic voltammetry curves of graphite foil and un-passivatied stainless steel in chloride electrolyte of embodiment 1-6 and 1-7 are shown in FIGS. 10 and 11. It can be seen that graphite foil is relatively stable in chloride solution, there is no significant oxidation or reduction peak in the whole electrochemical window except for the $O_2$ evolution at high potential. This demonstrates that carbon material is fit for the current collector in chloride solution but not un-passivatied stainless steel.

Example 2

The corrosion rate of various current collectors in acetate electrolyte could be obtained from Tafel curve in three-electrode system.

Example 2-1

In a three-electrode system, Al is working electrode, and Zn is counter and reference electrode. The corrosion behaviour of Al in acetate electrolyte containing 1.5 mol/L $Zn(Ac)_2$ and 3 mol/L LiAc is obtained from Tafel curve.

Example 2-2

In example 2-2, the working electrode is SS304 rod; the other parts of three-electrode system and test condition are the same as Example 2-1.

Example 2-3

In example 2-3, the working electrode is graphite rod; the other parts of three-electrode system and test condition are the same as Example 2-1.

Example 2-4

In example 2-4, the working electrode is Al alloy; the other parts of three-electrode system and test condition are the same as Example 2-1.

Example 2-5

In example 2-5, the working electrode is passivated SS304, the other parts of three-electrode system and test condition are the same as Example 2-1. SS304 is passivated by chemical method.

Example 2-6

In example 2-6, the working electrode is passivated Al alloy; the other parts of three-electrode system and test condition are the same as Example 2-1. Al alloy is passivated by electrochemical method of Charging and discharging the Al alloy for 1 cycle

Example 2-7

In example 2-7, the working electrode is passivated Al alloy; the other parts of three-electrode system and test condition are the same as Example 2-1. Al alloy is passivated by electrochemical method of charging and discharging the Al alloy for 50 cycles.

The corrosion current could be obtained from Tafel cure with equation 1. Based on the area and density of the working electrode, and the possible corrosion mechanism (the number of electron transferred during the corrosion process), the corrosion rates of different current collectors have been obtained and listed in Table 1, wherein, R is corrosion resistance, and $I_{corr}$ is corrosion current.

$$i = nFAk_0 \left\{ -c_O \exp\left[-\alpha \frac{nF}{RT}(E - E_0)\right] + c_R \exp\left[(1-\alpha)\frac{nF}{RT}(E - E_0)\right] \right\}$$

Equation 1

TABLE 1

| Example | Slop (catholic) | Slop (anodic) | R(Ω) | $I_{corr}$(A) | Corr. Rate (mm/year) |
|---|---|---|---|---|---|
| 2-1 | 6.88 | 4.85 | $2.53 \times 10^3$ | $1.45 \times 10^{-5}$ | 4.97 |
| 2-2 | 8.20 | 9.91 | $2.53 \times 10^4$ | $9.0 \times 10^{-7}$ | 0.33 |
| 2-3 | 5.78 | 4.33 | $8.88 \times 10^3$ | $4.84 \times 10^{-6}$ | 1.34 |
| 2-4 | 5.55 | 7.82 | $2.51 \times 10^4$ | $1.30 \times 10^{-6}$ | 0.44 |
| 2-5 | 15.1 | 8.77 | $1.12 \times 10^5$ | $1.63 \times 10^{-7}$ | 0.059 |
| 2-6 | 12.9 | 6.17 | $2.07 \times 10^5$ | $1.10 \times 10^{-7}$ | 0.037 |
| 2-7 | 10.4 | 4.3 | $1.77 \times 10^6$ | $1.68 \times 10^{-8}$ | 0.0027 |

It can be seen from table 1 that Al foil has the highest corrosion rate, the corrosion rates of SS and Al alloy in acetate electrolyte are about 10 times less than pure Al. After treatment with chemical oxidation and electrochemical oxidation, respectively, the corrosion rates of SS and Al alloy decreased about 6-12 times, respectively, and the corrosion rate of Al alloy becomes even less after extended oxidation cycles, which would arrive at 150 times less after 50 cycles. These results fit for the ones from CV, where the $O_2$ evolution curves become less significant after many cycles

Example 3

The performance of batteries is further studied as below.

Example 3-1

A cathode slurry is prepared comprising 83% $LiMn_2O_4$ as the cathode active material, 10% conductive agent acetylene black (AB), 7% Polyvinylidene fluoride (PVDF) binder in the solvent of N-methylpyrrolidone (NMP). The cathode slurry is coated evenly on a graphite foil, which served as the cathode current collector. The slurry is allowed to dry at 110° C. for 24 hours, to form the cathode plate. The anode current collector is stainless steel rod. The electrolyte comprises a water solution containing 4 mol/L zinc chloride and 3 mol/L lithium chloride. The pH value of electrolyte is adjusted to 4 by adding 0.1 mol/L LiOH. A grass felt is used as separator. The cathode electrode and anode electrode are assembled to form a battery, wherein the electrodes are separated with the separator. The electrolyte is injected into the battery and allowed to stand still for 12 hours. Following this, the battery is then charged and discharged with a 4 C rate. The voltage range of charging and discharging is 1.4-2.15 V.

Figure 12:
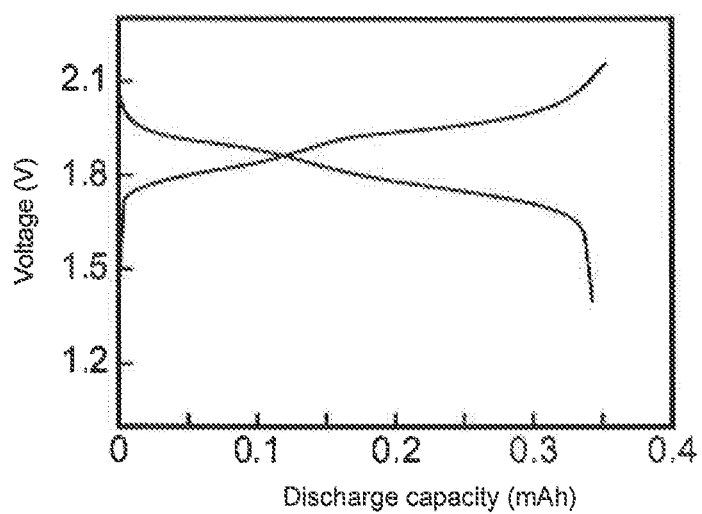
FIG. 12 is a voltage-discharge capacity curve of the battery in example 3-1.

The voltage-discharge capacity curve of the battery is shown in FIG. 12. As shown in FIG. 12, the coulombic efficiency of battery provided in example 3-1 is about 97%, which exhibits excellent cycling performance and no side reactions occur during the charging and discharging process.

Figure 13:
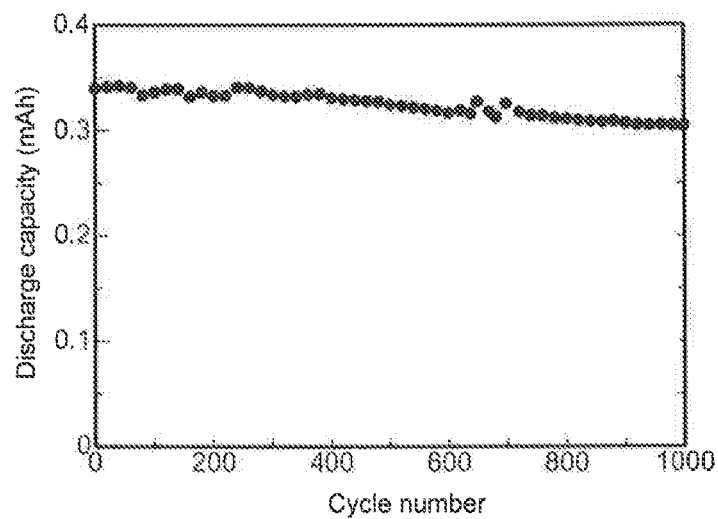
FIG. 13 is a cycles-discharge capacity curve of the battery in example 3-1.

The cycles-discharge capacity curve of the battery provided in example 3-1 is shown in FIG. 13. As shown in FIG. 13, the first capacity of battery is 0.35 mAh, with specific capacity 117 mAh/g based on the weight of cathode material, the capacity efficiency of battery is about 90% after 1000 cycles which exhibits excellent cycling performance.

Example 3-2

A battery is made according to a method similar to that described in example 3-1. However, in this case, $Li_{1.08}Co_{0.03}Al_{0.03}Mn_{1.94}O_4$ is used as the cathode active material instead of $LiMn_2O_4$.

Figure 14:
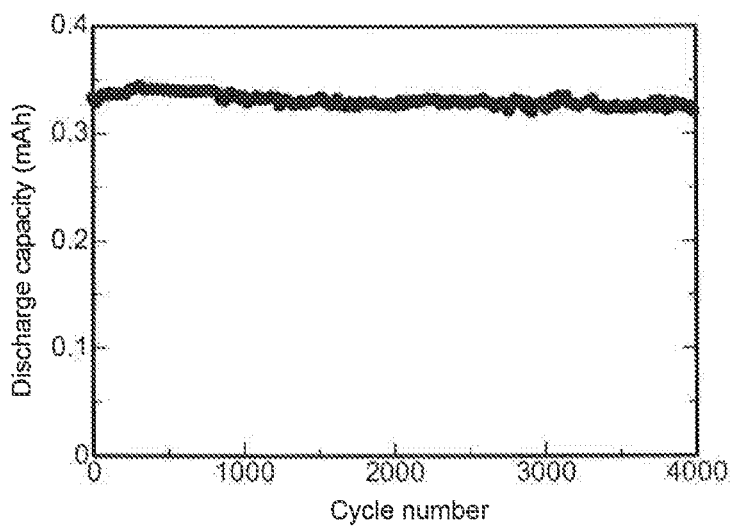
FIG. 14 is a cycles-discharge capacity curve of the battery in example 3-2.

The cycles-discharge capacity curve of the battery provided in example 3-2 is shown in FIG. 14. As shown in FIG. 14, the capacity efficiency of battery is about 95% after 4000 cycles which shows that the cycling performance of battery could be further improved with modified $LiMn_2O_4$.

Example 3-3

A battery is made according to a method similar to that described in example 3-1. However, in this case, the cathode slurry is prepared comprising 83% $Li_{1.05}Mn_{1.89}Co_{0.03}Al_{0.03}O_4$ as the cathode active material instead of $LiMn_2O_4$, 10% PVDF binder, 7% super-P in NMP solvent. The cathode current collector is a 1 mm thick graphite plate. The voltage range of charging and discharging is 1.5-2.1V.

Figure 15:
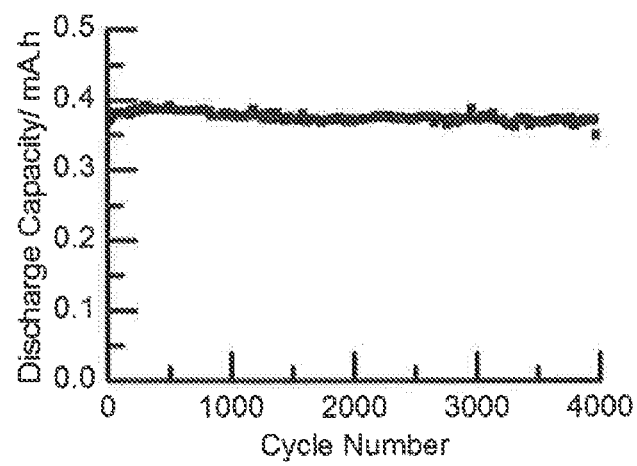
FIG. 15 is a cycles-discharge capacity curve of the battery in example 3-3.

The cycles-discharge capacity curve of the battery provided in example 3-3 is shown in FIG. 15. It can be seen that the discharge capacity of battery at 4000 cycles almost equal to that at initial cycle, the battery exhibits a stable cycling performance and long cycle life.

Figure 16:
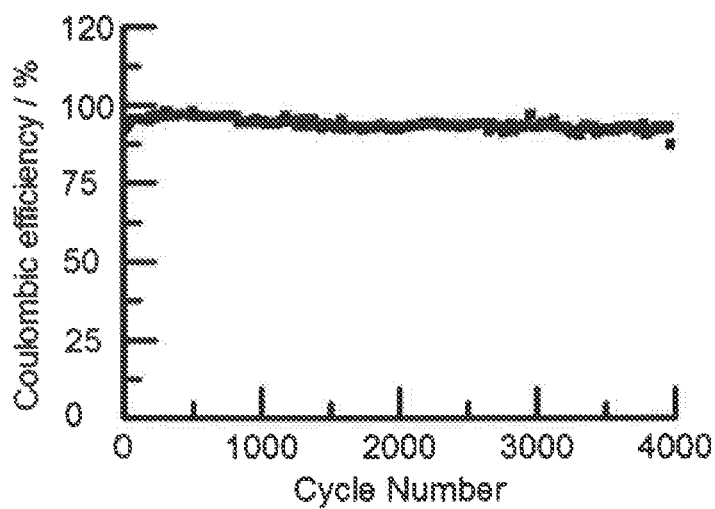
FIG. 16 is a cycles-coulombic efficiency curve of the battery in example 3-3.

The coulombic efficiency-cycles curve of the battery is shown in FIG. 16. As shown in FIG. 16, the coulombic efficiency of battery provided in example 3-3 is almost 100% after 4000 cycles, which exhibits excellent cycling performance.

Example 3-4

A cathode slurry is prepared comprising 83% $LiMn_2O_4$ as the cathode active material, 10% Polytetrafluoroethylene (PTFE) binder, 7% conductive agent super-P black, in the solvent of NMP. The cathode slurry is coated evenly on a 30 μm thick SS net, which served as the cathode current collector. The SS net is not passivated. The slurry is allowed to dry at 110° C. in air for 24 hours, to form the cathode. The anode current collector is a 10 μm thick Cu foil. The electrolyte comprises a water solution containing 1.5 mol/L zinc acetate and 1 mol/L lithium acetate. The pH value of electrolyte is adjusted to 4 by adding 0.1 mol/L LiOH and 0.1 mol/L HAc. A grass felt is used as separator. The cathode and anode are assembled to form a battery, wherein the electrodes are separated with the separator. The electrolyte is injected into the battery and allowed to stand still for 12 hours. Following this, the battery is then charged and discharged at a 0.5 C rate. The voltage range of charging and discharging is 1.5-2.1 V.

Figure 17:
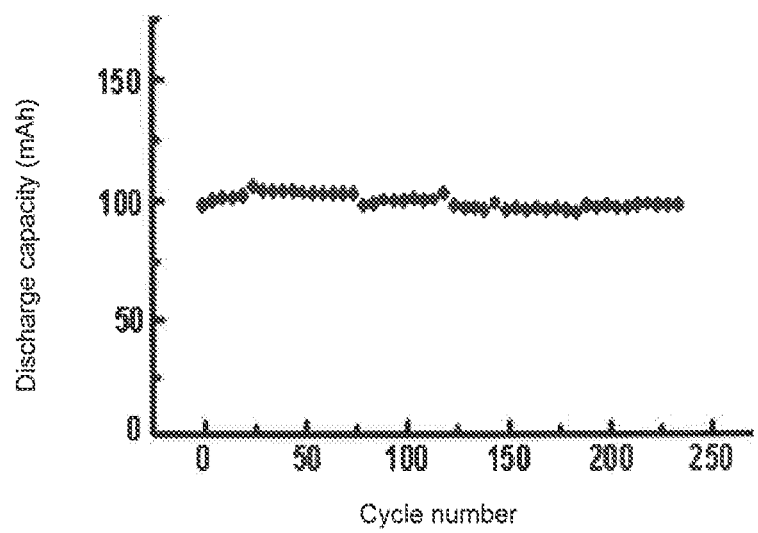
FIG. 17 is a cycles-discharge capacity curve of the battery in example 3-4.

The cycles-discharge capacity curve of the battery is shown in FIG. 17. As shown in FIG. 17, the initial discharge capacity of battery is about 100 mAh, which is almost equal to the capacity after 250 cycles. The battery is of excellent cycling performance.

Example 4-1

A cathode slurry is prepared comprising 90% $LiMn_2O_4$ as the cathode active material, 6% conductive carbon black, 2% SBR binder (styrene butadiene rubber milk), and 2% CMC (carboxymethyl cellulose sodium) in the solvent of water. The CMC is first mixed with water, followed by addition of the $LiMn_2O_4$ and conductive carbon black. The mixture is stirred for 2 hours, and followed by addition of SBR slurry. The mixture is then stirred for 10 minutes to form the cathode slurry. The cathode slurry of 0.3 mm thick is coated evenly on a 0.1 mm thick graphite foil, which served as the cathode current collector. The slurry is allowed to dry at 120° C. for 12 hours, to form the cathode. The anode current collector is a 10 μm thick graphite foil. The porous layer is prepared by mixing 90% active carbon powder (fired Coconut shell, surface area=1500 $m^2/g$), 5% conductive carbon black, 5% PVDF in NMP. The resulting slurry is evenly coated on the graphite foil to form porous layer of 0.1 mm thick. The electrolyte comprises a water solution containing 4 mol/L zinc chloride and 3 mol/L lithium chloride. A non-woven separator is used. The cathode and anode are assembled to form a battery, wherein the electrodes are separated with the separator. The electrolyte is injected into the battery and most of it exists inside the porous layer. During the charging and discharging process, $Zn^{2+}$ in electrolyte is reduced to Zn which deposits on the anode, especially inside the porous layer or the surface of porous layer and anode current collector during the charge cycle and deposited Zn can be oxidized to $Zn^{2+}$ during the discharge cycle.

Figure 18:
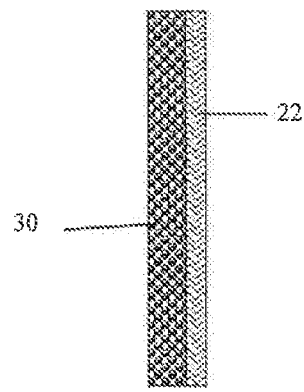
FIG. 18 schematically shows the anode current collector with porous layer.
Figure 19:
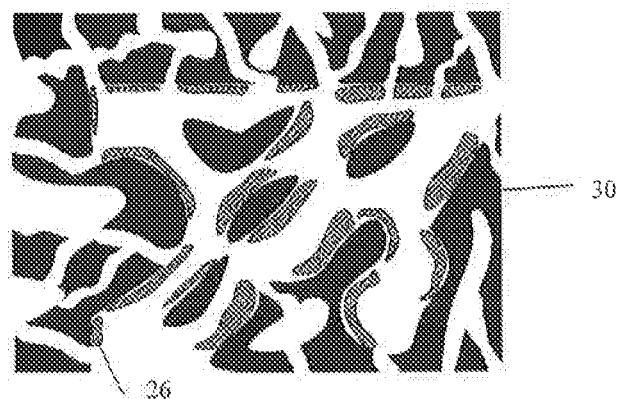
FIG. 19 is a partially enlarged view of porous layer in FIG. 18.

FIG. 18 is schematically showing the anode current collector with porous layer. $Zn^{2+}$ in electrolyte is reduced to Zn on the anode during the charge cycle and deposited Zn can be oxidized to $Zn^{2+}$ during the discharge cycle. Micron pores in activate carbon can effectively absorb large amounts of electrolyte and provide a place for zinc deposition. FIG. 19 is a partially enlarged view of porous layer in FIG. 18; active ion deposition layer is obviously seen in the internal of porous layer.

Figure 20:
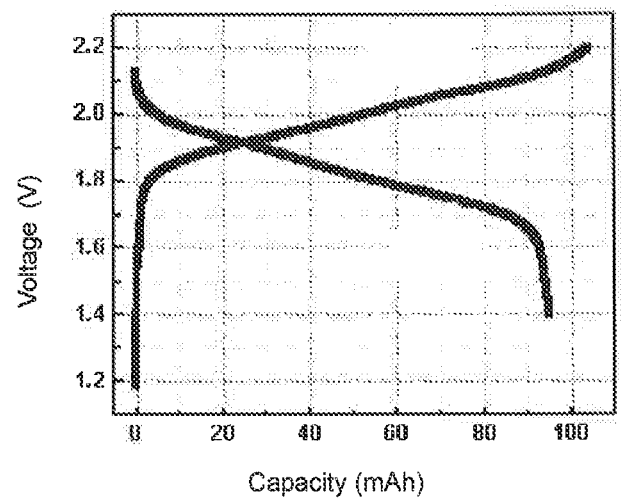
FIG. 20 is an initial charge and discharge voltage-capacity curve of the battery in example 4-1.

The battery is allowed to stand still for 12 hours after assembly. Following this, the battery is then charged and discharged with a 1 C rate. The voltage range of charging and discharging is 1.4-2.15 V (i.e., the battery is charged at constant current of 100 mAh to 2.15V, and then discharged at constant current to 1.4V, with these two steps being cycled). The initial discharge voltage-capacity curve of the $LiMn_2O_4$/Zn battery is shown in FIG. 20.

Example 4-2

A battery is made according to a method similar to that described in example 4-1. However, in this case, Cu foil plated with Sn is used as the anode current collector instead of graphite foil. To graphite, copper foil is of better conductivity, higher mechanical strength, and thinner, which can help to improve discharge performance and volumetric energy density of the battery, reduce the size of the battery. Pure Cu foil cannot be used as anode in ion exchange battery, for the deposition efficiency of Zn on the surface of the Cu foil is very low. Therefore, tin could be plated on the surface of Cu foil in order to improve deposition efficiency.

As the anode current collector itself does not significantly affect the performance of the battery, the charge and discharge curve of battery in example 4-2 is similar to that in embodiment 4-1.

Example 4.3

A battery is made according to a method similar to that described in example 4.1. However, in this case, a commercial active carbon fiber cloth is served as a porous layer.

The microstructure of activate carbon cloth is similar to active carbon; the thickness of active carbon is about 0.5 mm (uncompressed) and 0.1-0.2 mm after being compressed. The specific surface area of activate carbon fiber cloth is 800 $m^2/g$. The active carbon fiber cloth is cut into the same size as the anode current collector; the battery is assembled by overlapping the anode current collector, carbon fiber cloth, non-woven separator, and cathode in turn. The forming structure of battery is similar to the battery in FIG. 18, except the material of porous layer. Obviously, the structure of battery provided in example 4-3 is more simple and easier for industrial production. The carbon fiber cloth can also provide a large specific surface area of anode.

Example 5-1

Cathode slurry is prepared comprising 80% $LiMn_2O_4$ as the cathode active material, 10% conductive carbon black, 10% PVDF binder. After drying and molding, a disc with 12 mm diameter and 0.1-0.2 thickness is obtained. Cathode is prepared by pressing the obtained disc with cathode active material on the Al alloy, which is served as cathode current collector. Anode is metal Zn with 12 mm diameter and 1 mm thickness, which served as anode active material and anode current collector. The distance between cathode and anode is 5 mm; A filter paper is used as separator. Electrolyte is a water solution containing 4 mol/L lithium sulphate and 2 mol/L zinc sulphate. The pH value of electrolyte is adjusted to 5 by adding 0.1 mol/L LiOH.

The battery is charged and discharged at the voltage range 1.4-2.4V, the scanning rate is 0.5 mV/s. a passivated film is form on the surface of Al alloy under the high voltage 2.4V.

Example 5-2

A battery is made according to a method similar to that described in Example 5-1. However, in this case, the cathode current collector is Al alloy foil, anode is a 50 μm thick Zn foil, electrolyte is a water solution containing 1.5 mol/L zinc acetate and 2 mol/L lithium acetate, and a grass felt cloth separator is used.

Figure 21:
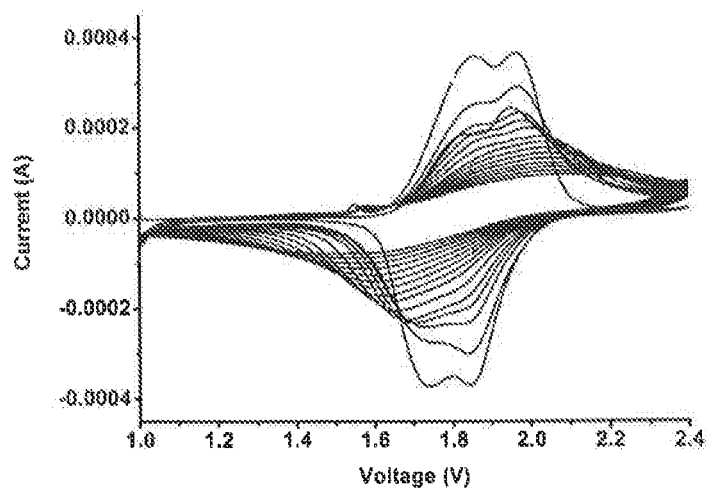
FIG. 21 is a cyclic voltammetry curve of battery in example 5-1.
Figure 22:
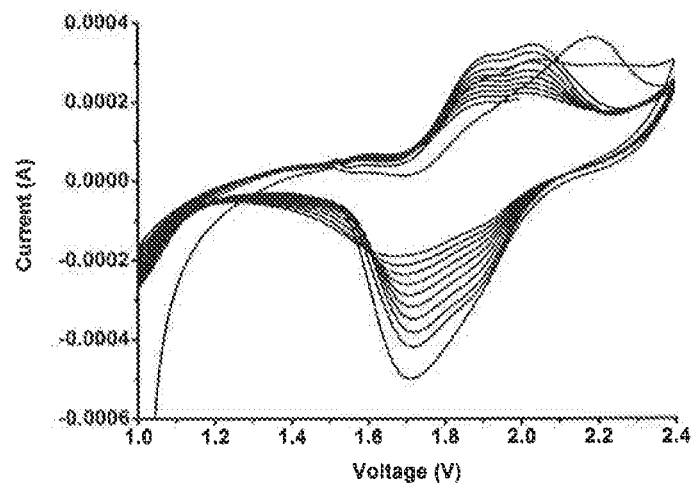
FIG. 22 is a cyclic voltammetry curve of battery in example 5-2.

Cyclic voltammetry curves of battery provided in example 5-1 and 5-2 is shown in FIGS. 21 and 22. It can be seen that there are two significant oxidation peaks (1.95 and 1.85 V) and two reduction peaks (1.85 and 1.7V) in each anodic and cathodic scanning. They fit for the mechanism of Li ions deintercalation/intercalation in organic electrolytes. In addition to the two significant redox couples, there is a small oxidation peak appearing after the $1^{st}$ cycle. The peak current appeared at about 1.6V, the small peak might come from the proton deintercalation/intercalation. This result further verifies the good stability and excellent cycling performance of the battery in the present invention.

Besides, the coulombic efficiency of battery provided in example 5-2 is about 90% after 600 cycles, which exhibits a high efficiency of charging and discharging.

Example 5-3

A battery is made according to a method similar to that described in Example 5-1. However, in this case, the cathode current collector is a 50 μm thick passivated SS304, electrolyte is a water solution containing 2 mol/L zinc sulphate and 2 mol/L lithium sulphate, and a grass felt cloth separator is used. The voltage range of charging and discharging is 1.4-2.1V. SS304 is passivated by a chemical oxidization that put SS in 20% concentrated $HNO_3$, maintain for half an hour and a passivation film is formed on the surface of SS.

Figure 23:
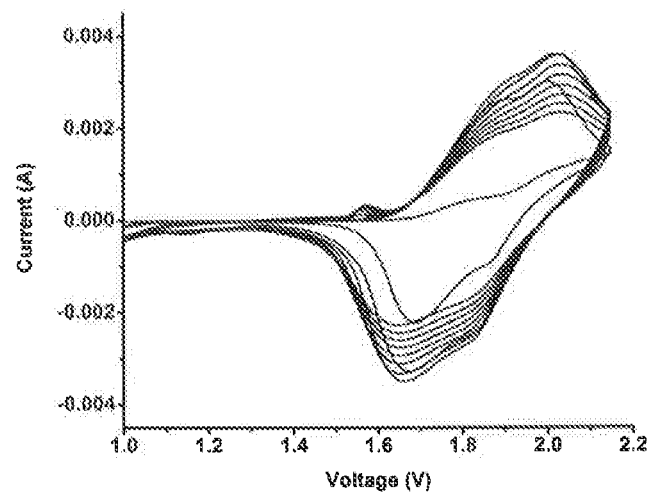
FIG. 23 is a cyclic voltammetry curve of battery in example 5-3.

Cyclic voltammetry curves of battery provided in example 5-3 is shown in FIG. 23.

Example 5-4

A battery is made according to a method similar to that described in Example 5-1. However, in this case, the cathode current collector is passivated SS304 the same as that of example 5-3, electrolyte is a water solution containing 3 mol/L zinc nitrate and 6 mol/L lithium nitrate. The voltage range of charging and discharging is 1.4-2.2V.

Figure 24:
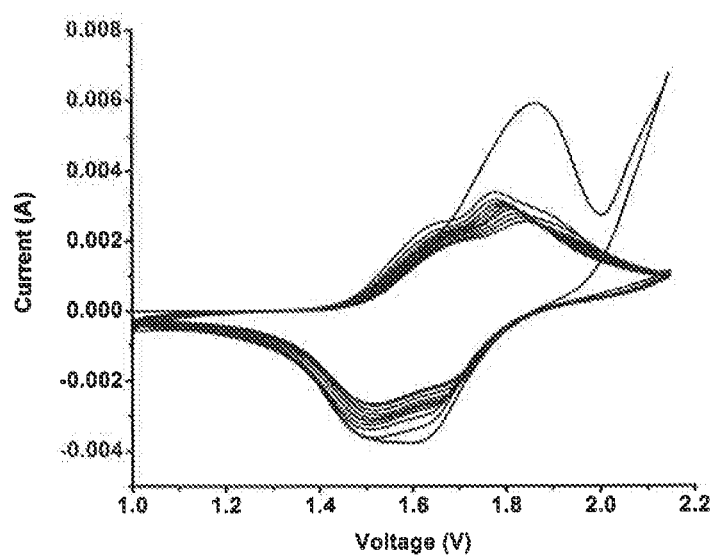
FIG. 24 is a cyclic voltammetry curve of battery in example 5-4.

Cyclic voltammetry curves of battery provided in example 5-4 is shown in FIG. 24.

Example 5-5

A battery is made according to a method similar to that described in Example 5-1. However, in this case, a 1 mm thick passivated SS304 is used as cathode current collector instead of graphite foil. The electrolyte is a water solution containing 1.5 mol/L zinc acetate and 3 mol/L lithium acetate. Metal Zn is used as anode. The battery is assembled and allowed to stand still for 12 hours. Following this, the battery is charged and discharged at constant current 1 mA. The voltage range of charging and discharging is 1.4-2.2V. The passivation method of SS304 is the same as that of example 5-3.

Example 5-6

A battery is made according to a method similar to that described in Example 5-5. However, in this case, a passivated SS316 is used as cathode current collector instead of passivated SS304. The battery is assembled and allowed to stand still for 12 hours. Following this, the battery is charged and discharged at constant current 1 mA and 3 mA. The voltage range of charging and discharging is 1.4-2.2V.

Figure 25:
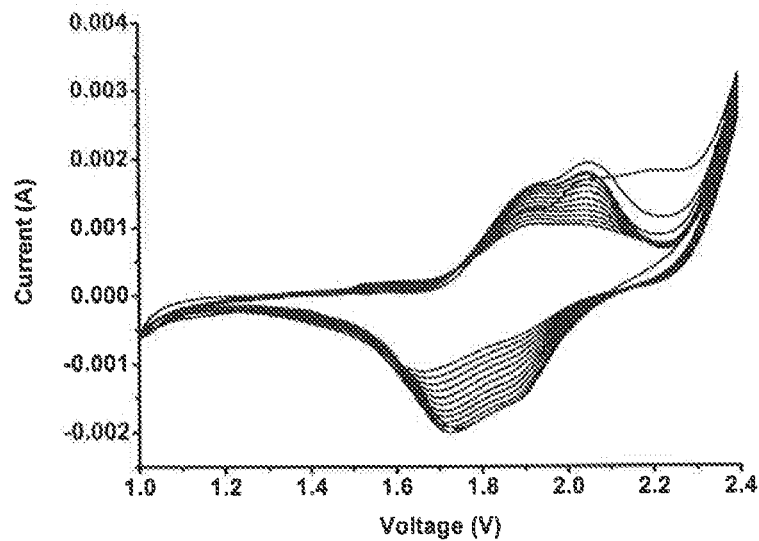
FIG. 25 is a cyclic voltammetry curve of battery in example 5-6.

Cyclic voltammetry curves of battery provided in example 5-6 is shown in FIG. 25.

Example 5-7

A battery is made according to a method similar to that described in Example 5-6. However, in this case, the electrolyte is a water solution containing 3 mol/L zinc sulphate and 3 mol/L lithium sulphate. The battery is assembled and allowed to stand still for 12 hours. Following this, the battery is charged and discharged at constant current 1 mA, 2 mA and 3 mA. The voltage range of charging and discharging is 1.4-2.2V.

Example 5-8

A battery is made according to a method similar to that described in Example 5-7. However, in this case, a passivated Al is used as cathode current collector. The battery is assembled and allowed to stand still for 12 hours. Following this, the battery is charged and discharged at constant current 1 mA. The voltage range of charging and discharging is 1.4-2.2V, and a passivation film is formed on the surface of Al under the voltage 2.4V.

Capacity Retention Rate Testing

The cycling performance of battery provided in example 5-1 to 5-8 is studied by charging and discharging process at constant current 1 mA and results after 80 cycles are shown in table 2.

It can be seen that the battery is of excellent capacity retention and coulombic efficiency when passivated SS is used as cathode current collector.

The battery provided in example 5-6 is charged and discharged at a constant current 3 mA, the capacity retention is 94% and coulombic efficiency is 98% after 80 cycles, the performance of battery is superior to that at constant current 1 mA, which exhibits a better performance at a large charge and discharge current.

TABLE 2

| example | Cathode active material | Cathode current collector | Anode | electrolyte | Capacity retention | Coulombic efficiency |
|---|---|---|---|---|---|---|
| 5-1 | $LiMn_2O_4$ | Passivated Al alloy | Zn | 4M $ZnSO_4$ 2M $Li_2SO_4$ | 72% | 84% |
| 5-2 | | Passivated Al alloy | | 2M LiAc 1.5M $Zn(Ac)_2$ | 61% | 92% |
| 5-3 | | Passivated SS | | 2M $ZnSO_4$ 2M $Li_2SO_4$ | 85% | 100% |
| 5-5 | | Passivated SS304 | | 1.5M $Zn(Ac)_2$ 3M LiAc | 81% | 98% |
| 5-6 | | Passivated SS316 | | | 89% | 97% |
| 5-7 | | Passivated SS316 | | 3M $ZnSO_4$ | 90% | 97% |
| 5-8 | | Passivated Al | | 3M $Li_2SO_4$ | 75% | 80% |

The battery provided in example 5-7 is charged and discharged at a constant current 2 mA and 3 mA, after 80 cycles, the capacity retention is 92% and 72% respectively, and the charge and discharge coulombic efficiencies both are 99%. The battery charged and discharged at constant current 2 mA is of best performance.

Example 5-9

Cathode slurry is prepared comprising 80% $LiMn_2O_4$ as the cathode active material, 10% conductive carbon black, 10% PVDF binder. The resulting cathode slurry is coated on stainless steel, which is served as cathode current collector. Anode is 50 μm thick metal Zn, which is served as anode active material and anode current collector. A grass felt cloth is used as separator. Electrolyte is a water solution containing 2 mol/L lithium acetate, 1.5 mol/L zinc acetate and 1 mol/L zinc sulphate. The pH value of electrolyte is adjusted to 5.

The battery is charged and discharged at the voltage range 1.4-2.1V; the scanning rate is 0.5 mV/s.

Figure 26:
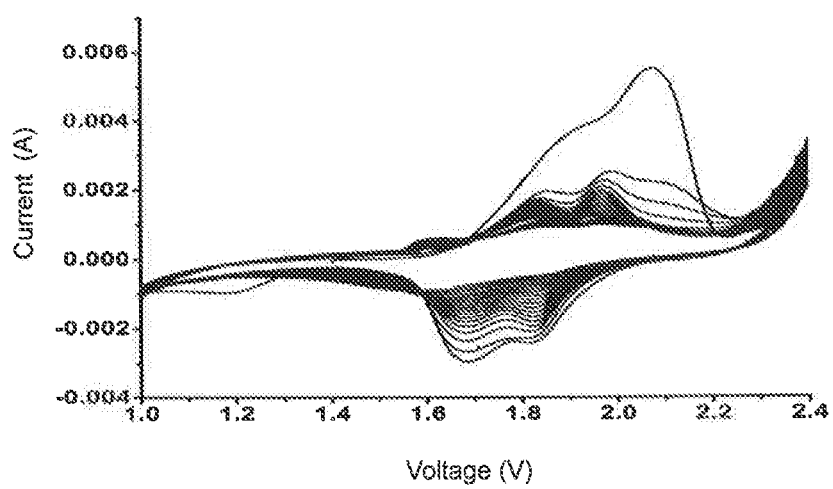
FIG. 26 is a cyclic voltammetry curve of battery in example 5-9.

Cyclic voltammetry curves of battery provided in example 5-9 is shown in FIG. 26. It shows in result that the coulombic efficiency of battery is almost 100% after 200 cycles, which demonstrates that battery with mixed electrolyte is of excellent performance of charging and discharging.

Example 6-1

Cathode slurry is prepared by mixing 83% $LiMn_2O_4$ as the cathode active material, 10% super-P carbon black, 7% PVDF binder in solvent NMP. The resulting cathode slurry is coated on graphite foil, which is served as cathode current collector. Following this, the cathode is prepared by drying and pressing the cathode slurry. Anode is 50 μm thick Zn foil, which is served as anode active material and anode current collector. A grass felt cloth is used as separator. Electrolyte is a deionized water solution containing 3 mol/L lithium chloride and 4 mol/L zinc chloride. The pH value of electrolyte is adjusted to 4 by adding 0.1 mol/L LiOH. The battery is charged and discharged with a 4 C rate at ambient temperature.

Figure 27:
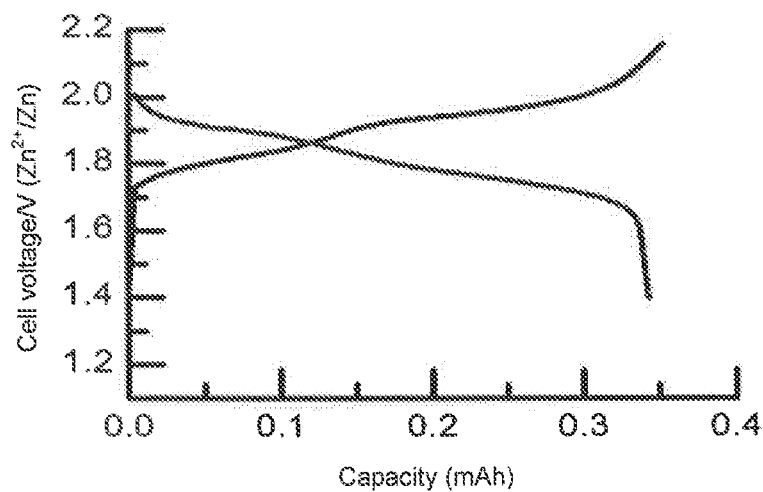
FIG. 27 is an initial charge and discharge voltage-capacity curve of the battery in example 6-1.

The initial charge and discharge capacity-voltage curve of the battery provided in example 6-1 is shown in FIG. 27. It can be seen that the initial discharge capacity of battery is about 0.35 mAh.

Figure 28:
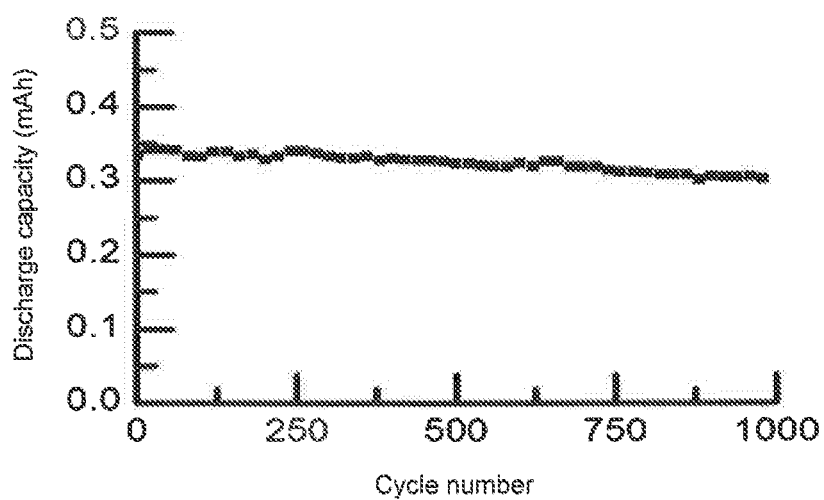
FIG. 28 is a cycles-discharge capacity curve of the battery in example 6-1.

The cycles-discharge capacity curve of the battery is shown in FIG. 28. Capacity retention of battery remains at above 85% after 1000 cycles; the small capacity fading indicates that the battery has a very good stability.

Figure 29:
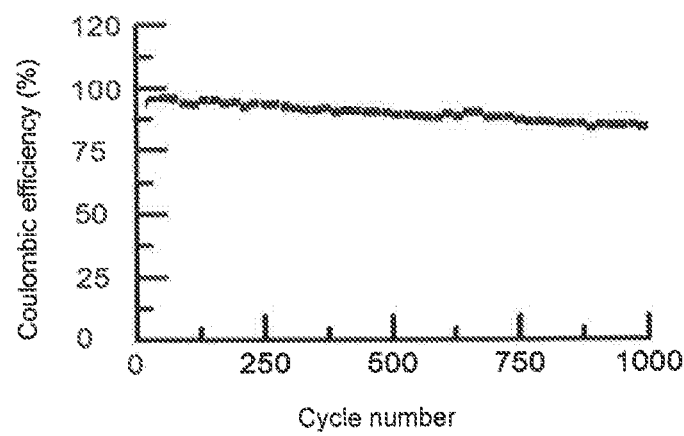
FIG. 29 is a cycles-coulombic efficiency curve of the battery in example 6-1.

The cycles-coulombic efficiency curve of the battery is shown in FIG. 29. It can be seen that the coulombic efficiency is above 80% after 1000 cycles.

Example 6-2

Cathode slurry is prepared by mixing 83% $LiMn_2O_4$ as the cathode active material, 10% super-P carbon black, 7% PVDF binder in solvent NMP. The resulting cathode slurry is coated on graphite foil, which is served as cathode current collector. Following this, the cathode is prepared by drying and pressing the cathode slurry. Anode is 50 μm thick Zn foil, which is served as anode active material and anode current collector. A grass felt cloth is used as separator. Electrolyte is a deionized water solution containing 3 mol/L lithium chloride and 4 mol/L zinc chloride. The pH value of electrolyte is adjusted to 4 by adding 0.1 mol/L LiOH. The battery is charged and discharged with a 1 C rate at ambient temperature. The voltage range of charging and discharging is 1.5-2.1V.

Figure 30:
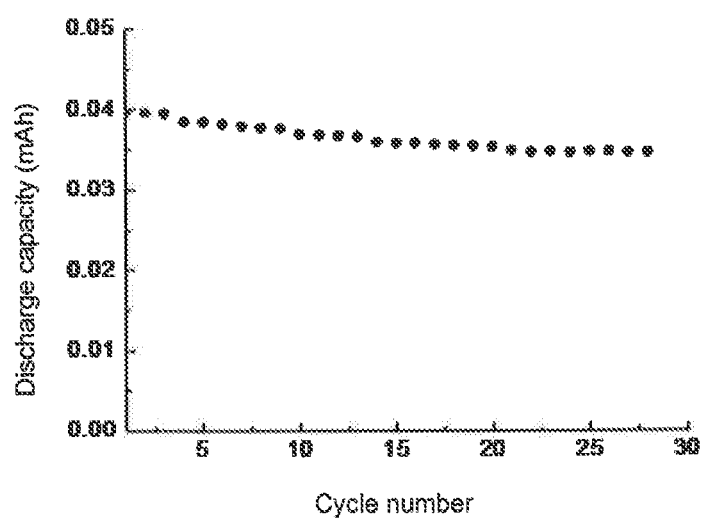
FIG. 30 is a cycles-discharge capacity curve of the battery in example 6-2.

The discharge capacity-cycles curve of the battery provided in example 6-2 is shown in FIG. 30. After 30 cycles, there is a slightly loss in battery capacity but at a slow fading rate.

Figure 31:
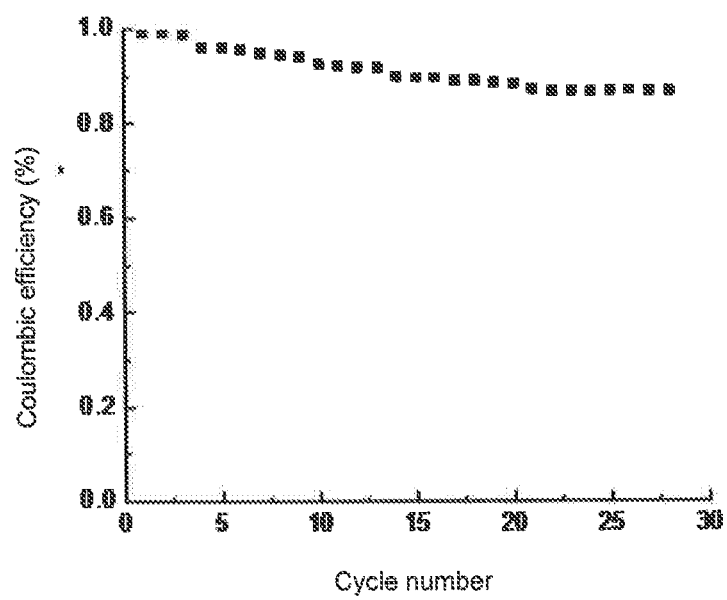
FIG. 31 is a cycles-coulombic efficiency curve of the battery in example 6-2.

The cycles-coulombic efficiency curve of the battery is shown in FIG. 31. It can be seen that the coulombic efficiency is about 90% after 30 cycles.

Example 6-3

Cathode slurry is prepared by mixing 83% $LiMn_2O_4$ as the cathode active material, 10% super-P carbon black, 7% CMC-SBR in solvent NMP. The resulting cathode slurry is coated on a 50 μm thick un-passivated SS foil, which is served as cathode current collector. Following this, the cathode is prepared by drying and pressing the cathode slurry. Anode is 40 μm thick Zn foil, which is served as anode active material and anode current collector. A grass felt cloth is used as separator. Electrolyte is a water solution containing 1 mol/L lithium acetate and 1.5 mol/L zinc acetate. The pH value of electrolyte is adjusted to 4 by adding 0.1 mol/L LiOH and 0.1 mol/L HAc. The battery is charged and discharged with a 0.5 C rate at ambient temperature. The voltage range of charging and discharging is 1.5-2.1V.

The experimental results of examples 6-3 show that the retention and coulombic efficiencies of battery are close to 100% after 320 cycles, indicating that the battery has a very excellent cycle performance and life.

Example 6-4

A battery is made according to a method similar to that described in example 6-3. However, in this case, the battery is charged and discharged at 55□.

Figure 32:
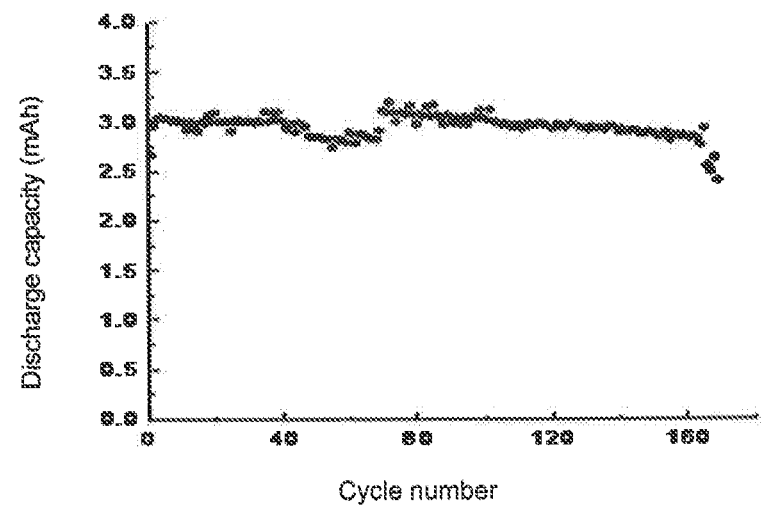
FIG. 32 is a cycles-discharge capacity curve of the battery in example 6-4.

The discharge capacity-cycles curve of the battery provided in example 6-4 is shown in FIG. 32. There is no obvious loss in battery capacity after 160 cycles. The battery is of great discharge capacity retention even at 55□.

Example 6-5

Cathode slurry is prepared by mixing 83% $LiMn_2O_4$ as the cathode active material, 10% super-P carbon black, 7% PVDF in solvent NMP. The resulting cathode slurry is coated on a 30 μm thick SS net, which is served as cathode current collector. Following this, the cathode is prepared by drying and pressing the cathode slurry. A 10 μm thick Zn foil is used as anode current collector and anode active material. A grass felt cloth is used as separator. Electrolyte is a water solution containing 1 mol/L lithium acetate and 1.5 mol/L zinc acetate. The pH value of electrolyte is adjusted to 4 by adding 0.1 mol/L LiOH and 0.1 mol/L HAc. The battery is charged and discharged with a 0.5 C rate at ambient temperature. The voltage range of charging and discharging is 1.5-2.1 V.

Figure 33:
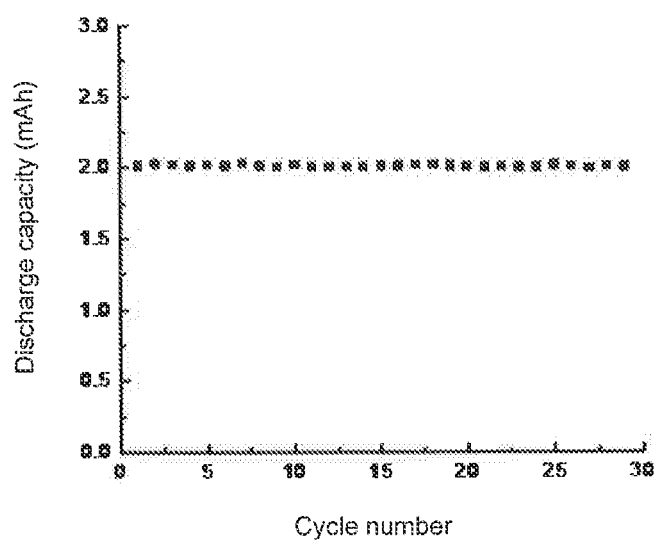
FIG. 33 is a cycles-discharge capacity curve of the battery in example 6-5.

The discharge capacity-cycles curve of the battery provided in example 6-5 is shown in FIG. 33. After 30 cycles, there is no obvious loss in battery capacity, indicating that the battery is of great performance.

Example 7-1

Cathode slurry is prepared by mixing 80% $LiMn_2O_4$ as the cathode active material, 10% super-P carbon black, 10% PVDF in solvent NMP. The resulting cathode slurry is coated on an 80 μm thick graphite foil, which is served as cathode current collector. Following this, the cathode is prepared by drying and pressing the cathode slurry. A 50 μm thick graphite foil is used as anode current collector, on which a metal Zn is plated as anode active material. A grass felt cloth is used as separator. Electrolyte is a water solution containing 2 mol/L lithium acetate and 1.5 mol/L zinc acetate. The pH value of electrolyte is adjusted to 4 by adding 0.1 mol/L LiOH and 0.1 mol/L HAc. The battery is charged and discharged with a 0.5 C rate at ambient temperature. The voltage range of charging and discharging is 1.5-2.1V.

Example 7-2

A battery is made according to a method similar to that described in example 7-1. However, in this case, SS316 is used as anode current collector instead of graphite foil.

Example 7-3

A battery is made according to a method similar to that described in example 7-1. However, in this case, Cu foil is used as anode current collector instead of graphite foil.

The battery provided in example 7-1 to 7-3 are all of great cycling performance.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The disclosures of all prior art recited herein are incorporated herein by reference in their entirety.

We claim:

1. A battery, comprising:
   a cathode having a spinel structure of a general formula $Li_{1+x}Mn_yM_zO_k$, wherein $-1 \leq x \leq 0.5$, $1 \leq y \leq 2.5$, $0 \leq z \leq 0.5$, and $3 \leq k \leq 6$, M is selected from Na, Co, Mg, Ti, Cr, V, Zn, Zr, Si, and Al;
   an anode comprising an anode current collector that does not participate in the electrochemical reaction;
   an electrolyte comprising a solvent capable of dissolving active ions that can be reduced to a metal during a charge cycle and be oxidized from the metal to the dissolved active ions state during a discharge cycle and intercalation-deintercalation ions that can deintercalate from the cathode active material during the charge cycle and intercalate into the cathode active material during the discharge cycle;
   the anode further comprising an anode active material formed on the anode current collector, the anode active material comprising at least one metal selected from Zn, Fe, Cr, Cu, Mn, Ni and a combination thereof;
   wherein the anode active material is oxidized from the metal to the dissolved active ions during the discharge cycle.

2. The battery according to claim 1, wherein the anode active material is formed on the anode current collector as a coating, electroplating or sputtering.

3. The battery according to claim 1, wherein the anode current collector comprises one metal selected from Ni, Cu, Ag, Pb, Sn, Fe, Al or a passivated metal thereof.

4. The battery according to claim 1, wherein the anode current collector comprises at least one selected from carbon based material, stainless steel, silicon or a metal with electroplating layer or coating layer selected from at least one of C, Sn, In, Ag, Pb, Co, or an alloy thereof, or an oxide thereof.

5. The battery according to claim 4, wherein a thickness range of the electroplating layer or coating layer is 1-1000 nm.

6. The battery according to claim 1, wherein the anode further comprises a porous layer formed on the anode current collector, the porous layer has a micron or sub-micron or nano pores.

7. The battery according to claim 6, wherein the porous layer comprises at least one carbon-based material selected from Ketjen black, active carbon, carbon nanotube, carbon fibre, or graphite.

8. The battery according to claim 6, wherein the porous layer comprises a carbon-based material, the carbon-based material is a mixture of active carbon powder and binder, the weight rate range of the active carbon powder in the porous layer is 20-99%.

9. The battery according to claim 1, wherein the anode comprises a graphene layer formed on the anode current collector.

10. The battery according to claim 1, wherein the anode active material is formed on the anode current collector being suffered a surface pre-treatment, the surface pre-treatment is selected from at least one of mechanical treatment, chemical treatment, or electrochemical treatment.

11. The battery according to claim 1, wherein pH range of the electrolyte is 3-7.

12. The battery according to claim 1, wherein the active ion is in the form of at least one of chloride, sulphate, nitrate, acetate, formate, phosphate in the electrolyte.

13. The battery according to claim 1, wherein material of the cathode current collector is selected from graphite, stainless steel, Al alloy, passivated stainless steel, or passivated Al alloy.

14. A battery, comprising;
- a cathode having a spinel structure of a general formula $Li_{1+x}Mn_yM_zO_k$, wherein $-1 \leq x \leq 0.5$, $1 \leq y \leq 2.5$, $0 \leq z \leq 0.5$, and $3 \leq k \leq 6$, M is selected from Na, Co, Mg, Ti, Cr, V, Zn, Zr, Si, and Al;
- an anode comprising an anode current collector that does not participate in the electrochemical reaction, the anode current collector is formed of copper;
- an electrolyte comprising a solvent capable of dissolving active ions that can be reduced to a metal during a charge cycle and be oxidized from the metal to the dissolved active ions state during a discharge cycle and intercalation-deintercalation ions that can deintercalate from the cathode active material during the charge cycle and intercalate into the cathode active material during the discharge cycle;
- the anode further comprising an anode active material formed on the anode current collector, the anode active material formed of zinc;
- wherein the anode active material is oxidized from the metal to the dissolved active ions during the discharge cycle.

* * * * *